United States Patent
Kumar et al.

(10) Patent No.: US 12,452,820 B2
(45) Date of Patent: Oct. 21, 2025

(54) METHOD AND APPARATUS FOR HANDLING REGISTRATION OF USER EQUIPMENT FOR DISASTER ROAMING SERVICE IN WIRELESS COMMUNICATION SYSTEM

(71) Applicant: Samsung Electronics Co., Ltd., Suwon-si (KR)

(72) Inventors: Lalith Kumar, Bangalore (IN); Aman Agarwal, Bangalore (IN); Kailash Kumar Jha, Bangalore (IN); Samiran Bhowmik, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 17/670,343

(22) Filed: Feb. 11, 2022

(65) Prior Publication Data

US 2022/0256493 A1     Aug. 11, 2022

(30) Foreign Application Priority Data

Feb. 11, 2021   (IN) .............................. 202141005910
Jul. 13, 2021   (IN) .............................. 202141031507
Jan. 29, 2022   (IN) .............................. 202141005910

(51) Int. Cl.
*H04W 60/04*   (2009.01)
*H04W 4/90*    (2018.01)
(Continued)

(52) U.S. Cl.
CPC ............. *H04W 60/04* (2013.01); *H04W 4/90* (2018.02); *H04W 8/12* (2013.01); *H04W 84/042* (2013.01)

(58) Field of Classification Search
CPC ......... H04W 60/04; H04W 4/90; H04W 8/12; H04W 84/042; H04W 48/18; H04W 48/02; H04L 69/40
(Continued)

(56) References Cited

U.S. PATENT DOCUMENTS 11,856,423 B2    12/2023   Kim et al.
2012/0044869 A1   2/2012   Tiwari
(Continued)

FOREIGN PATENT DOCUMENTS

EP       3930359 A1    12/2021
WO    2020204283 A1    10/2020

OTHER PUBLICATIONS

Qualcomm, Solution to MNT Key Issue #8 (Prevention of Signaling overload by returning UEs in PLMN previously with Disaster Condition), C1-210118, Jan. 25-29, 2021. (Year: 2021).*
(Continued)

*Primary Examiner* — Mang Hang Yeung

(57) ABSTRACT

The disclosure relates to a 5G or 6G communication system for supporting a higher data transmission rate. Embodiments herein provide a method for handling registration of a UE (100) for disaster roaming service in a network (1000) by a second PLMN (200*b*). In an embodiment, the method includes sending a registration reject message to the UE (100) in response to determining that the UE is not allowed to receive the disaster roaming service, with a first PLMN as PLMN with the disaster condition, from the second PLMN. In another embodiment, the method includes determining whether the second PLMN (200*b*) provides the disaster roaming service or a normal service to the UE (100) in response to determining that the UE is allowed to receive the service from the second PLMN (200*b*), and sending a registration accept message to the UE (100).

12 Claims, 16 Drawing Sheets

(51) Int. Cl.
*H04W 8/12* (2009.01)
*H04W 84/04* (2009.01)

(58) Field of Classification Search
USPC .......................................................... 370/329
See application file for complete search history.

(56) References Cited

U.S. PATENT DOCUMENTS

2022/0070815 A1* 3/2022 Chun .................... H04W 48/16
2022/0182854 A1* 6/2022 Kim ...................... H04W 60/04

OTHER PUBLICATIONS

3GPP TR 24.811 v0.1.0 (Dec. 2020), 3rd Generation Partnership Project; Technical Specification Group Core Network and Terminals; Study on the support for minimization of service interruption; (Release 17) (Year: 2020).*
3GPP TS 24.501 V0.0.0 (2017-10); Technical Specification; 3rd Generation Partnership Project; Technical Specification Group Core Network and Terminals; Non-Access-Stratum (NAS) protocol for 5G System (5GS); Stage 3 (Release 15), 15 pages.
International Search Report and Written Opinion of the International Searching Authority issued Jun. 7, 2022, in connection with International Application No. PCT/KR2022/002095, 9 pages.
Qualcomm Incorporated, "Solution to MINT Key Issue #8 (Prevention of signalling overload by returning UEs in PLMN previously with Disaster Condition)," 3GPP TSG-CT WG1 Meeting #127bis-e, C1-210118, Electronic meeting; Jan. 25-29, 2021, 4 pages.
3GPP TR 24.811 V0.1.0 (Dec. 2020) Technical Report; 3rd Generation Partnership Project; Technical Specification Group Core Network and Terminals; Study on the support for minimization of service interruption; (Release 17); 14 pages.
GSM Association, "2G/2.5G/3G Roaming," GSM Association Classifications, Official Document: IR.50—Unrestricted, Version 3.1.1, Apr. 2004, 33 pages.
LG Electronics, "New solution to KI#5: Handling of forbidden PLMN list," 3GPP TSG-CT WG1 Meeting #127bis-e, C1-210222, Electronic meeting; Jan. 25-29, 2021, 3 pages.
Supplementary European Search Report dated Feb. 27, 2024, in connection with European Patent Application No. 22753016.9, 14 pages.
Qualcomm Incorporated, "Solution to MINT Key Issue #5 (PLMN selection when a "Disaster Condition" applies)," 3GPP TSG-CT WG1 Meeting #127bis-e, C1-210115, Electronic meeting; Jan. 25-29, 2021, 5 pages.
Samsung, "Solution to KI#4: Confining a Disaster Inbound Roamer UEs area of service to the area of the disaster condition," 3GPP TSG-CT WG1 Meeting #127bis-e, C1-210307, Electronic meeting; Jan. 25-29, 2021, 3 pages.
Huawei et al., "Solution for KI#6: O M-based solution," 3GPP TSG-CT WG1 Meeting #127bis-e, C1-210363, Electronic meeting; Jan. 25-29, 2021, 4 pages.

* cited by examiner

METHOD AND APPARATUS FOR HANDLING REGISTRATION OF USER EQUIPMENT FOR DISASTER ROAMING SERVICE IN WIRELESS COMMUNICATION SYSTEM

CROSS-REFERENCE TO RELATED APPLICATIONS

This application is based on and derives the benefit of Indian Patent Application No. 202141005910, filed Feb. 11, 2021, Indian Patent Application No. 202141031507, filed Jul. 13, 2021, and Indian Patent Application No. 202141005910, filed Jan. 29, 2022, and the contents of which are incorporated herein by reference in their entirety.

BACKGROUND

1. Field

The present disclosure relates to a wireless network, and more specifically related to a method and a system to handle a registration of a User Equipment (UE) for a disaster roaming service in the wireless network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The embodiment herein is to provide a method for handling registration of a UE for disaster roaming service in a wireless network. The method includes receiving, by a network entity of a second PLMN, a registration request for the disaster roaming service from the UE with a first PLMN as PLMN with a disaster condition. Further, the method includes determining, by the network entity of the second PLMN, whether the UE is allowed to receive the disaster roaming service with first PLMN as PLMN with the disaster condition from the second PLMN or the UE is allowed to receive normal service from the second PLMN. Further, the method includes performing, by the network entity of the second PLMN, one of: sending a registration reject message to the UE in response to determining that the UE is not allowed to receive the disaster roaming service, with the first PLMN as PLMN with the disaster condition, from the second PLMN, wherein the registration reject message comprises a reject cause indicating that UE is not allowed to receive services from the second PLMN with the first PLMN as the PLMN with disaster condition, and determining whether the second PLMN provides the disaster roaming service or normal service to the UE in response to determining that the UE is allowed to receive the service from the second PLMN, and sending a registration accept message to the UE, wherein the registration accept message comprises an information element indicating one of: 'the registration request for the disaster roaming service is accepted as registration not for the disaster roaming service' when the second PLMN provides the normal services to the UE, and 'no additional information' when the second PLMN provides the disaster roaming service to the UE.

The embodiment herein is to provide a method for handling registration of a UE for disaster roaming service in a wireless network. The method includes detecting, by the UE, a first PLMN as PLMN with a disaster condition. Further, the method includes sending, by the UE, a registration request for the disaster roaming service to a second PLMN, when the second PLMN provides the disaster roaming service with the first PLMN as PLMN with the disaster condition. Further, the method includes receiving, by the UE, one of: a registration reject message from the second PLMN, where the registration reject message comprises a reject cause indicating that UE is not allowed to receive disaster roaming services, with the first PLMN as PLMN with the disaster condition, from the second PLMN, and a registration accept message from the second PLMN, wherein the registration accept message comprises an information element (IE) indicating one of 'the registration request for the disaster roaming service is accepted as registration not for the disaster roaming service' when the second PLMN provides normal services to the UE or 'no additional information' when the second PLMN provides the disaster roaming service to the UE.

The embodiment herein is to provide a network entity of a second PLMN for handling registration of a UE for disaster roaming service in a wireless network. The network entity of the second PLMN includes a transceiver, a memory and a processor. The processor coupled with the memory and the processor and is configured to receive a registration request for the disaster roaming service from the UE with a first PLMN as PLMN with a disaster condition. Further, the processor is configured to determine whether the UE is allowed to receive the disaster roaming service with first PLMN as PLMN with the disaster condition from the second PLMN or the UE is allowed to receive normal service from the second PLMN. Further, the processor is configured to perform one of send a registration reject message to the UE in response to determining that the UE is not allowed to receive the disaster roaming service, with the first PLMN as PLMN with the disaster condition, from the second PLMN, wherein the registration reject message comprises a reject cause indicating that UE is not allowed to receive services from the second PLMN with the first PLMN as the PLMN with disaster condition, and determine whether the second PLMN provides the disaster roaming service or normal service to the UE in response to determining that the UE is allowed to receive the service from the second PLMN, and send a registration accept message to the UE, wherein the registration accept message comprises an information element indicating one of: 'the registration request for the disaster roaming service is accepted as registration not for the disaster roaming service' when the second PLMN provides the normal services to the UE, and 'no additional information' when the second PLMN provides the disaster roaming service to the UE.

The embodiment herein is to provide a UE for handling registration for disaster roaming service in a wireless network. The UE includes a transceiver, a memory and a processor. The processor coupled with the transceiver and the memory and is configured to detect a first PLMN as PLMN with a disaster condition and send a registration request for the disaster roaming service to a second PLMN, when the second PLMN provides the disaster roaming service with the first PLMN as PLMN with the disaster condition. The processor is configured to receive one of: a registration reject message from the second PLMN, wherein the registration reject message comprises a reject cause indicating that UE is not allowed to receive disaster roaming services, with the first PLMN as PLMN with the disaster condition, from the second PLMN, and a registration accept message from the second PLMN, wherein the registration accept message comprises an IE indicating one of 'the registration request for the disaster roaming service is accepted as registration not for the disaster roaming service' when the second PLMN provides normal services to the UE or 'no additional information' when the second PLMN provides the disaster roaming service to the UE.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which.

DETAILED DESCRIPTION

Figure 1:
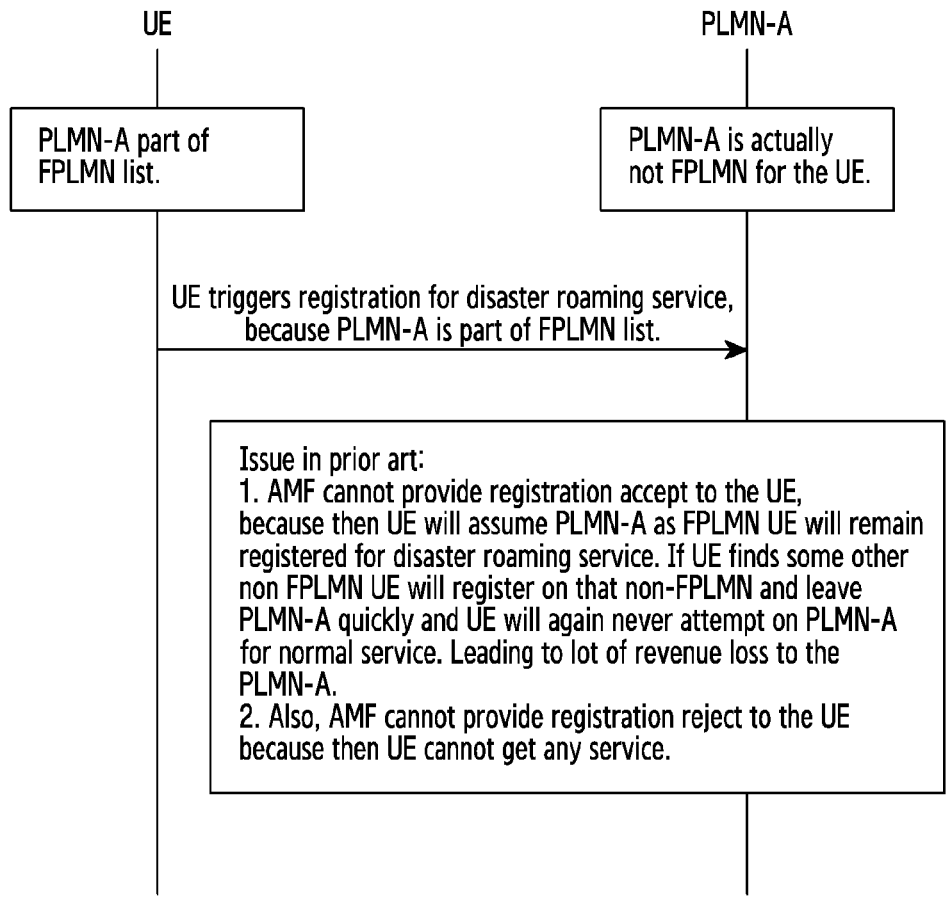
FIG. 1 illustrates an issue in the conventional system.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Definitions for other certain words and phrases are provided throughout this patent document. Those of ordinary skill in the art should understand that in many if not most instances, such definitions apply to prior as well as future uses of such defined words and phrases.

The purpose of Minimization of Service Interruption (MINT) is to minimize interruption of service to users when the wireless network to which these users are subscribed cannot provide service due to a disaster, such as, for example, a fire, by enabling the users to obtain service on other networks, while at the same time protecting those other networks from congestion. In an example, consider a PLMN D is subject to disaster and a PLMN A is alive and not subject to the disaster and PLMN A is a PLMN providing disaster roaming services. A User Equipment (UE) determines that the PLMN D has "Disaster Condition" when there is no available cell of the PLMN D and broadcast signalling received via an available cell of another PLMN A indicates that PLMN A can accept "Disaster Inbound Roamers" from PLMN D; If the UE determines that the PLMN D has "Disaster Condition", determines that PLMN A can accept "Disaster Inbound Roamers" from the PLMN D, the PLMN D is not in the UE's list of forbidden PLMNs and PLMN A is in the UE's list of forbidden PLMNs, then in automatic PLMN selection, the UE shall consider the PLMN A as PLMN to receive disaster roaming service (despite PLMN A being in UE's list of forbidden PLMNs).

The terms disaster based service and disaster roaming service have used interchangeably herein and have the same meaning.

One issue as illustrated in the FIG. 1 is that UE is having a PLMN-A part of FPLMN list because it had received NAS reject cause #11 in the past. There is no other PLMN available in the area to provide normal service. Only FPLMNs are available. The UE determines disaster condition thus initiates registration on PLMN-A for disaster roaming given that PLMN-A is part of FPLMN list. The AMF receives registration for disaster roaming from the UE but AMF of PLMN-A determines it can provide normal service to the UE. Following the prior art the AMF cannot provide registration accept to the UE, because then UE will assume PLMN-A as FPLMN and then UE will remain registered for disaster roaming service. If UE finds some other non FPLMN UE will register on that non-FPLMN and leave PLMN-A quickly and UE will again never attempt on PLMN-A as from UE perspective PLMN-A is in the FPLMN list of the UE. Leading to lot of revenue loss to the PLMN-A. On another hand the AMF cannot provide registration reject to the UE because then UE cannot get any service neither normal service nor disaster roaming service. Thus there is a need to handle the case when UE attempts to register for disaster roaming service on PLMN-A as PLMN-A is wrongly part of FPLMN list of the UE, the PLMN-A can be wrongly part of FPLMN list of the UE because PLMN-A and HPLMN had no roaming agreement in past and now they have a roaming agreement to provide normal services to the UE or due to some other reasons as per the prior art.

Figure 2:
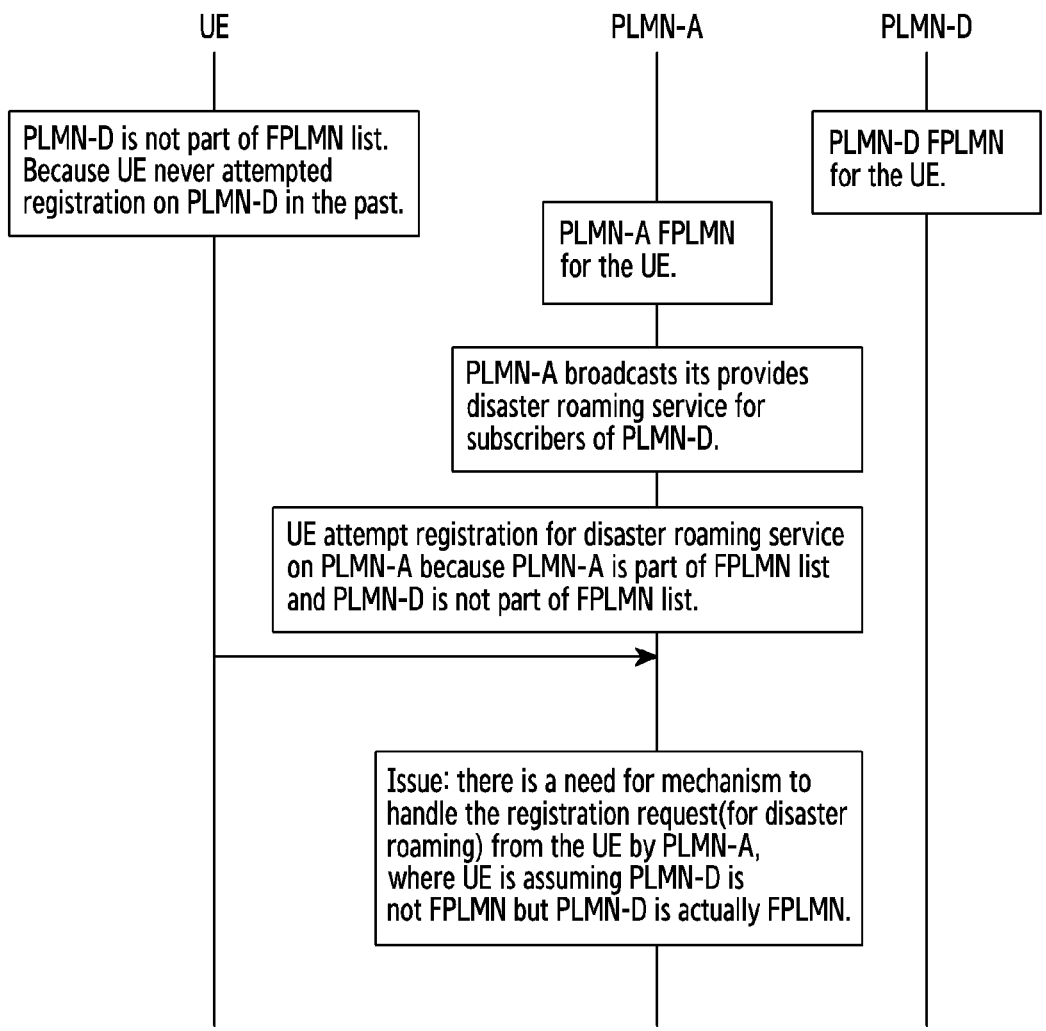
FIG. 2 illustrates an issue in the conventional system.

In another issue as illustrated in the FIG. 2, the PLMN-D that is the PLMN with disaster condition is not part of FPLMN list of the UE because UE never attempted registration on PLMN-D in the past. Any PLMN to enter FPLMN list UE has to make a registration attempt on that PLMN and in response registration reject is provided to the UE indicating it is a FPLMN i.e. reject cause #11 but if UE does not attempt registration on that PLMN then UE will not know that PLMN is FPLMN. Thus when PLMN-A (which is part of FPLMN lists) broadcasts that it allows disaster roaming service for subscribers of PLMN-D, UE will attempt to receive disaster roaming service on PLMN-A because PLMN-A is part of FPLMN list and PLMN-D is not part of FPLMN list. But in actual PLMN-D is also FPLMN for the UE thus UE should have not attempted for disaster roaming service on PLMN-A. Thus there is a need for mechanism at PLMN-A more precisely AMF of PLMN-A on handling when a registration request for disaster roaming service is received by PLMN-A for PLMN-D as PLMN with disaster condition where PLMN-D is actually FPLMN of the UE but UE is not aware about it.

Further, when the UE is registered to a PLMN (for e.g. PLMN A1) for disaster inbound roaming for the PLMN (for e.g. PLMN D) and is in a connected mode, if there is another PLMN (for e.g. PLMN A2) is available and if PLMN A1 wants to trigger a handover procedure to PLMN A2 for the UE, whether it is possible or not and if possible, how it is handled is not clear in the prior art and needs to be defined.

Thus, it is desired to address the above mentioned disadvantages or other shortcomings or at least provide a useful alternative.

The principal object of the embodiments herein is to provide a method and a system to handle registration of a UE for a disaster roaming service in a wireless network.

Another object of the embodiments herein is to handle a FPLMN on a disaster support PLMN.

Yet another object to provide an AMF for determining whether it can provide normal service or disaster roaming service to the UE. The AMF send an indication in registration accept message as part of 5GS registration result IE that UE is registered for the disaster roaming service or normal service. Based on this indication, the UE determines to remain registered for normal service or disaster roaming service. When the UE gets an indication that it is registered for normal service it can remove the FPLMN from forbidden PLMN lists. Further, when the UE gets an indication that it is registered for disaster roaming service it continues to retain the FPLMN in forbidden PLMN lists.

Accordingly, the embodiment herein is to provide a method for handling registration of a UE for disaster roaming service in a wireless network. The method includes receiving, by a second PLMN, a registration request for the disaster roaming service from the UE with a first PLMN as PLMN with a disaster condition. Further, the method includes determining, by the second PLMN, whether the UE is allowed to receive the disaster roaming service with first PLMN as PLMN with the disaster condition from the second PLMN or the UE is allowed to receive normal service from the second PLMN. Further, the method includes performing, by the second PLMN, one of: sending a registration reject message to the UE in response to determining that the UE is not allowed to receive the disaster roaming service, with the first PLMN as PLMN with the disaster condition, from the second PLMN, wherein the registration reject message comprises a reject cause indicating that UE is not allowed to receive services from the second PLMN with the first PLMN as the PLMN with disaster condition, and determining whether the second PLMN provides the disaster roaming service or normal service to the UE in response to determining that the UE is allowed to receive the service from the second PLMN, and sending a registration accept message to the UE, wherein the registration accept message comprises an information element indicating one of: 'the registration request for the disaster roaming service is accepted as registration not for the disaster roaming service' when the second PLMN provides the normal services to the UE, and 'no additional information' when the second PLMN provides the disaster roaming service to the UE.

Referring now to the drawings and more particularly to FIGS. 1 to 7, 9a and 9b, where similar reference characters denote corresponding features consistently throughout the figures, there are shown preferred embodiments.

Below are the conventional scenarios for how to indicate the UE about the Forbidden PLMN in case the UE has not tried on the Forbidden PLMN previously.

PLMN D is disaster PLMN in a certain area and PLMN A is providing disaster roaming services to subscribers of PLMN D or inbound roamers of PLMN-D.

Consider that a particular UE is roaming into this region for 1st time and hence doesn't have updated FPLMN list.

The UE by the virtue of subscription or roaming agreement between PLMN-D and Home PLMN (HPLMN) of the UE, is not allowed to receive services from PLMN-D. But, the UE doesn't know this until and unless UE has tried on PLMN D.

If PLMN D is already in disaster situation, then the UE might directly attempt on PLMN A after determining that PLMN A is providing disaster inbound roaming services optionally after determining additional information that disaster service is provided for PLMN D (for example after reading SIB since PLMN A will broadcast PLMN D as disaster PLMN).

However this behaviour is incorrect and PLMN A should not provide service to such UE for which PLMN D should have been in forbidden PLMN list. Thus there is a need for new indication from PLMN A to the UE with respect to above problem statement.

Figure 3A:
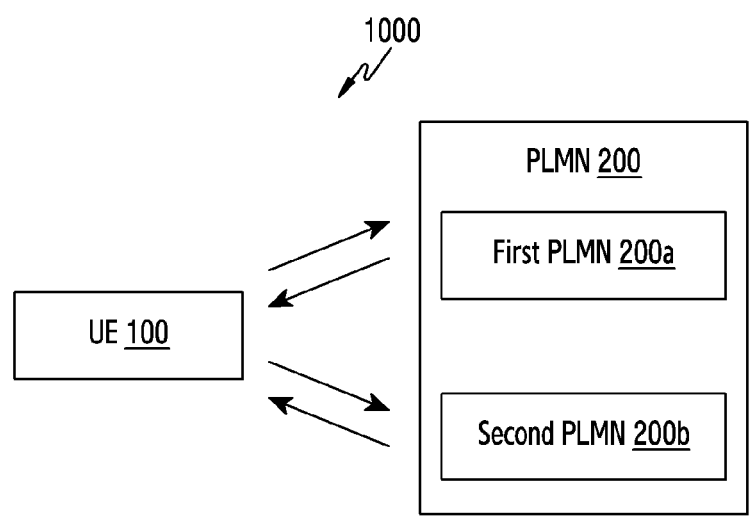
FIG. 3a an overview of a wireless network for handling registration of a UE for disaster roaming service, according to an embodiment as disclosed herein.

FIG. 3a illustrates an overview of a wireless network (1000) for handling registration of a UE (100) for a disaster roaming service, according to an embodiment as disclosed herein. In an embodiment, the wireless network (1000) includes a UE (100) and a PLMN (200) having a first PLMN (200*a*) and a second PLMN (200*b*). The wireless network (1000) can be, for example, but not limited to a 5G network, a 6G network and an O-RAN network. The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device.

The UE (100) is configured to detect the first PLMN (200*a*) as PLMN with the disaster condition. Based on the detection, the UE (100) is configured to send a registration request for the disaster roaming service to the second PLMN (200*b*), when the second PLMN (200*b*) provides the disaster roaming service with the first PLMN (200*a*) as PLMN with the disaster condition. The registration request for the disaster roaming service includes a registration type value set to "disaster roaming initial registration" or "disaster roaming mobility registration updating" or a new information element indicating registration for disaster roaming service.

In an embodiment, the UE (100) is configured to detect whether a FPLMN list is stored at the UE (100) and detect the disaster condition by the UE (100) and one of the FPLMN is offering the disaster roaming service. Further, the UE (100) is configured to select the second PLMN (200*b*) from the FPLMN list in response to determining that the FPLMN list is stored at the UE (100), and send the registration request for the disaster roaming service to the second PLMN (200*b*).

The second PLMN (200*b*) is configured to receive the registration request for the disaster roaming service from the UE (100) with the first PLMN (200*a*) as PLMN with the disaster condition. Based on the registration request, the second PLMN (200*b*) is configured to determine whether the UE (100) is allowed to receive the disaster roaming service with the first PLMN (200*a*) as PLMN with the disaster condition from the second PLMN (200*b*) or the UE (100) is allowed to receive the normal service from the second PLMN (200*b*). In an embodiment, in response to determining that the UE (100) is not allowed to receive the disaster roaming service, with the first PLMN (200*a*) as PLMN with the disaster condition, from the second PLMN (200*b*), the second PLMN (200*b*) is configured to send the registration reject message to the UE (100). The registration reject message includes a reject cause indicating that the UE (100) is not allowed to receive services from the second PLMN (200*b*) with the first PLMN (200*a*) as the PLMN with disaster condition.

In another embodiment, in response to determining that the UE (100) is allowed to receive the service from the second PLMN (200*b*), the second PLMN (200*b*) is configured to determine whether the second PLMN (200*b*) provides the disaster roaming service or a normal service to the UE (100) and send a registration accept message to the UE (100). The registration accept message includes an information element indicating one of: 'the registration request for the disaster roaming service is accepted as registration not for the disaster roaming service' when the second PLMN (200*b*) provides the normal services to the UE (100), and 'no additional information' when the second PLMN provides the disaster roaming service to the UE (100). The information element can be a 5GS registration result information.

Based on the registration request, in an embodiment, the UE (100) is configured to receive a registration reject message from the second PLMN (200*b*). In another embodiment, the UE (100) is configured to receive a registration accept message from the second PLMN (200*b*).

Further, the UE (100) is configured to remove the second PLMN (200*b*) from the FPLMN list stored at the UE (100) and consider the UE (100) itself as registered for the normal services upon receiving the registration accept message comprising the registration result IE indicating 'the registration request for the disaster roaming service is accepted as registration not for the disaster roaming service'.

Further, the UE (100) is configured to continue retain the second PLMN (200*b*) in the FPLMN list stored at the UE (100) and consider itself registered for disaster roaming upon receiving the registration accept message comprising the registration result IE indicating 'no additional information'.

Further, the UE (100) is configured to continue add the second PLMN (200*b*) to the FPLMN list at the UE (100) upon receiving the registration accept message comprising the registration result IE indicating 'no additional information'.

Upon receiving the registration reject message from the second PLMN (200*b*), the UE (100) is configured to perform one of add the first PLMN (200*a*) to the FPLMN list, mark a flag indicating that the UE (100) should never try for the disaster roaming services on the second PLMN (200*b*) during the disaster situation with the first PLMN (200*a*) as PLMN with the disaster condition, mark a flag indicating that the UE (100) should never try for the disaster roaming services on the second PLMN (200*b*) during the disaster situation, and mark a flag indicating that the UE (100) should never try for the disaster roaming services on any FPLMN with the first PLMN (200*a*) as PLMN with the disaster condition.

Figure 3B:
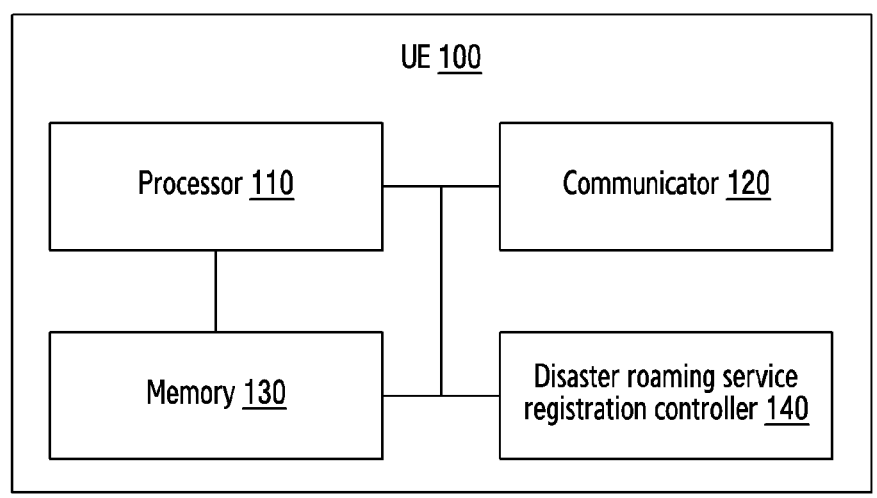
FIG. 3b illustrates various hardware components of a UE, according to an embodiment as disclosed herein.

FIG. 3*b* shows various hardware components of the UE (100), according to an embodiment as disclosed herein. In an embodiment, the UE (100) includes a processor (110), a communicator (120), a memory (130), and a disaster roaming service registration controller (140). The processor (110) is coupled with the communicator (120), the memory (130) and the disaster roaming service registration controller (140).

The disaster roaming service registration controller (140) is configured to detect the first PLMN (200*a*) as PLMN with the disaster condition. Based on the detection, the disaster roaming service registration controller (140) is configured to send a registration request for the disaster roaming service to the second PLMN (200*b*), when the second PLMN (200*b*) provides the disaster roaming service with the first PLMN (200*a*) as PLMN with the disaster condition. The registration request for the disaster roaming service includes a registration type value set to "disaster roaming initial registration" or "disaster roaming mobility registration updating" or a new information element indicating registration for disaster roaming service.

In an embodiment, the disaster roaming service registration controller (140) is configured to detect whether the FPLMN list is stored at the UE (100) and detect the disaster condition by the UE (100) and one of the FPLMN is offering the disaster roaming service. Further, the disaster roaming service registration controller (140) is configured to select the second PLMN (200*b*) from the FPLMN list in response to determining that the FPLMN list is stored at the UE (100), and send the registration request for the disaster roaming service to the second PLMN (200*b*).

Based on the registration request, in an embodiment, the disaster roaming service registration controller (140) is configured to receive a registration reject message from the second PLMN (200*b*). The registration reject message includes the reject cause indicating that the UE (100) is not allowed to receive disaster roaming services, with the first PLMN (200a) as the PLMN with the disaster condition, from the second PLMN (200b).

In another embodiment, the disaster roaming service registration controller (140) is configured to receive the registration accept message from the second PLMN (200b). The registration accept message includes the IE indicating one of 'the registration request for the disaster roaming service is accepted as registration not for the disaster roaming service' when the second PLMN (200b) provides normal services to the UE (100) or 'no additional information' when the second PLMN (200b) provides the disaster roaming service to the UE (100).

Further, the disaster roaming service registration controller (140) is configured to remove the second PLMN (200b) from the FPLMN list stored at the UE (100) and consider the UE (100) itself as registered for the normal services upon receiving the registration accept message comprising the registration result IE indicating 'the registration request for the disaster roaming service is accepted as registration not for the disaster roaming service'.

Further, the disaster roaming service registration controller (140) is configured to continue retain the second PLMN (200b) in the FPLMN list stored at the UE (100) and consider itself registered for disaster roaming upon receiving the registration accept message comprising the registration result IE indicating 'no additional information'.

Further, the disaster roaming service registration controller (140) is configured to continue add the second PLMN (200b) to the FPLMN list at the UE (100) upon receiving the registration accept message comprising the registration result IE indicating 'no additional information'.

Upon receiving the registration reject message from the second PLMN (200b), the disaster roaming service registration controller (140) is configured to perform one of add the first PLMN (200a) to the FPLMN list, mark a flag indicating that the UE (100) should never try for the disaster roaming services on the second PLMN (200b) during the disaster situation with the first PLMN (200a) as PLMN with the disaster condition, mark a flag indicating that the UE (100) should never try for the disaster roaming services on the second PLMN (200b) during the disaster situation, and mark a flag indicating that the UE (100) should never try for the disaster roaming services on any FPLMN with the first PLMN (200a) as PLMN with the disaster condition.

The disaster roaming service registration controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. In addition, the operation of the disaster roaming service registration controller (140) may be performed by the processor (110).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 3b illustrates various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

Figure 3C:
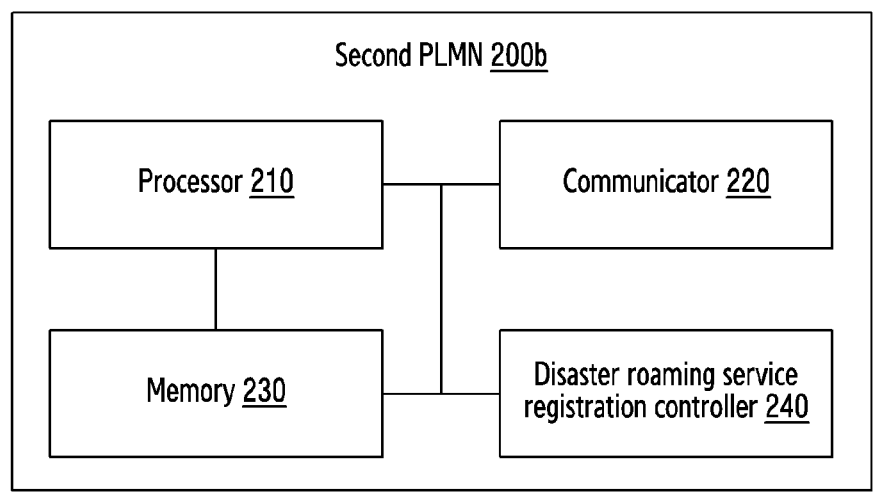
FIG. 3c illustrates various hardware components of a second PLMN, according to an embodiment as disclosed herein.

FIG. 3c shows various hardware components of the second PLMN (200b), according to an embodiment as disclosed herein. The second PLMN shown in FIG. 3C may include a network entity of the second PLMN. For example, a network entity of the second PLMN may include, but is not limited to, access and mobility management function (AMF), session management function (SMF), network repository function (NRF), unified data management (UDM), network exposure function (NEF), authentication server function (AUSF) and policy control function (PCF). In an embodiment, the second PLMN (200b) includes a processor (210), a communicator (220), a memory (230), and a disaster roaming service registration controller (240). The processor (210) is coupled with the communicator (220), the memory (230) and the disaster roaming service registration controller (240).

The disaster roaming service registration controller (240) is configured to receive the registration request for the disaster roaming service from the UE (100) with the first PLMN (200a) as PLMN with the disaster condition. Based on the registration request, the disaster roaming service registration controller (240) is configured to determine whether the UE (100) is allowed to receive the disaster roaming service with the first PLMN (200a) as PLMN with the disaster condition from the second PLMN (200b) or the UE (100) is allowed to receive the normal service from the second PLMN (200b). In an embodiment, in response to determining that the UE (100) is not allowed to receive the disaster roaming service, with the first PLMN (200a) as PLMN with the disaster condition, from the second PLMN (200b), the disaster roaming service registration controller (240) is configured to send the registration reject message to the UE (100) wherein the registration reject message includes a reject cause indicating that the UE (100) is not allowed to receive services from the second PLMN (200b) with the first PLMN (200a) as the PLMN with disaster condition.

In another embodiment, in response to determining that the UE (100) is allowed to receive the service from the second PLMN (200b), the disaster roaming service registration controller (240) is configured to determine whether the second PLMN (200b) provides the disaster roaming service or a normal service to the UE (100) and send a registration accept message to the UE (100). The registration accept message includes an information element indicating one of: 'the registration request for the disaster roaming service is accepted as registration not for the disaster roaming service' when the second PLMN (200b) provides the normal services to the UE (100), and 'no additional information' when the second PLMN provides the disaster roaming service to the UE (100). The information element can be a 5GS registration result information.

The disaster roaming service registration controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. In addition, the operation of the disaster roaming service registration controller (240) may be performed by the processor (210).

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 33*c* shows various hardware components of the second PLMN (200*b*) but it is to be understood that other embodiments are not limited thereon. In other embodiments, the second PLMN (200*b*) may include less or more number of components. Further, the labels or names of the components are used only for illustrative purpose and does not limit the scope of the invention. One or more components can be combined together to perform same or substantially similar function in the second PLMN (200*b*).

Figure 4:
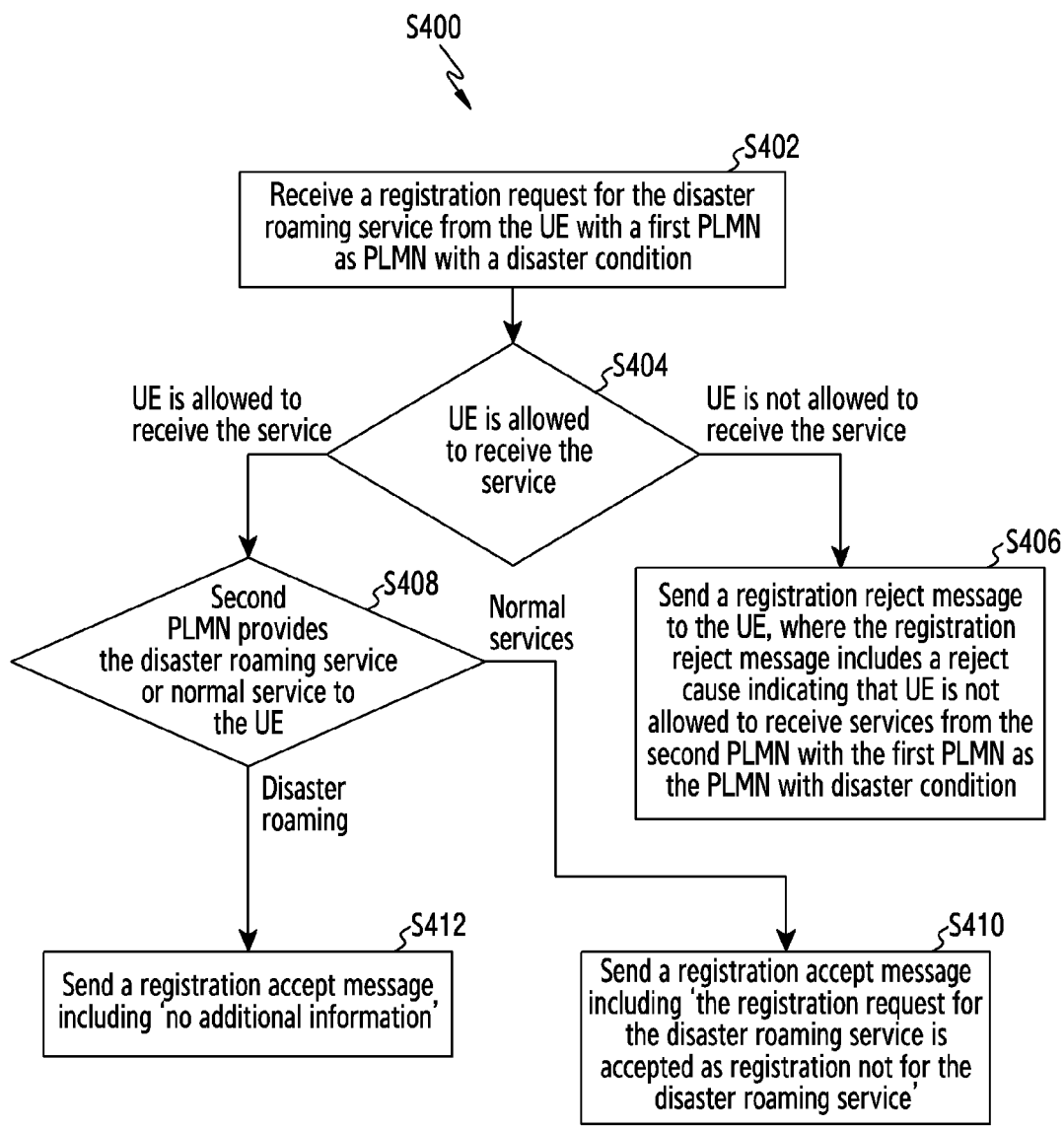
FIG. 4 is a flow chart illustrating a method, implemented by the second PLMN, for handling registration of the UE for disaster roaming service in the wireless network, according to an embodiment as disclosed herein.

FIG. 4 is a flow chart (S400) illustrating a method, implemented by the second PLMN (200*b*), for handling registration of the UE (100) for disaster roaming service in the wireless network (1000), according to an embodiment as disclosed herein. In this disclosure, the meaning of being implemented by the second PLMN may include the meaning of being implemented by a network entity of the second PLMN. For example, the meaning of being implemented by the second PLMN may include the meaning of being implemented by an AMF of the second PLMN. The operations (S402-S412) are performed by the disaster roaming service registration controller (240) or the processor (210, 1230).

At S402, the method includes receiving the registration request for the disaster roaming service from the UE (100) with the first PLMN (200*a*) as the PLMN with the disaster condition. At S404, the method includes determining whether the UE (100) is allowed to receive the disaster roaming service with the first PLMN (200*a*) as the PLMN with the disaster condition from the second PLMN or the UE (100) is allowed to receive the normal service from the second PLMN (200*b*).

In response to the UE (100) is not allowed to receive the disaster roaming service, at S406, the method includes sending the registration reject message to the UE (100), where the registration reject message includes the reject cause indicating that the UE (100) is not allowed to receive services from the second PLMN (200*b*) with the first PLMN (200*a*) as the PLMN with disaster condition. At S408, the method includes determining whether the second PLMN (200*b*) provides the disaster roaming service or the normal service to the UE (100).

If the second PLMN (200*b*) provides the normal service to the UE (100), at S410, the method includes sending the registration accept message including an information element indicating 'the registration request for the disaster roaming service is accepted as registration not for the disaster roaming service'. If the second PLMN (200*b*) provides the disaster roaming service to the UE, at S412, the method includes sending the registration accept message including an information element indicating 'no additional information'.

Figure 5A:
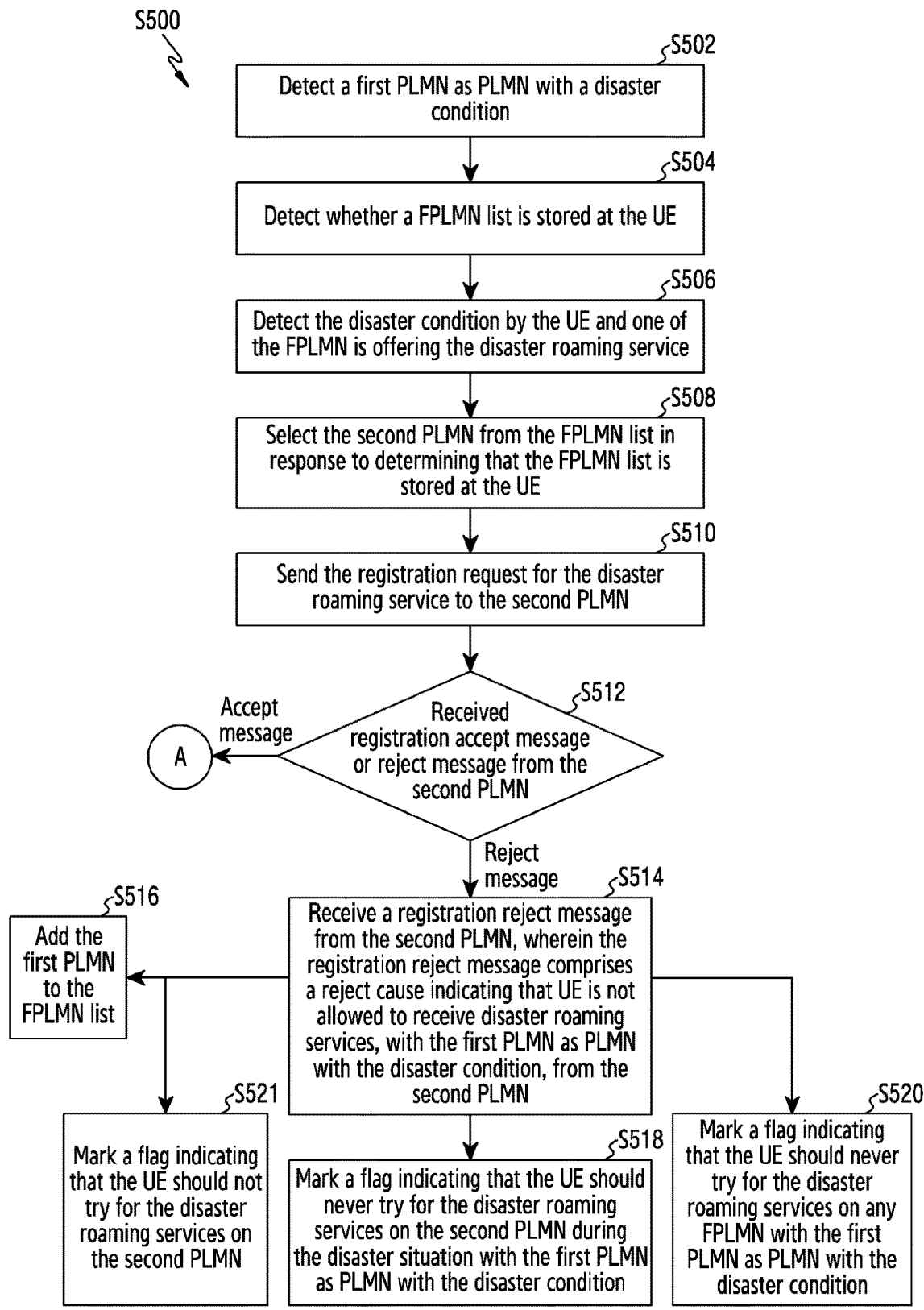
FIG. 5a and FIG. 5b are flow charts illustrating a method, implemented by the UE, for handling registration of the UE for disaster roaming service in the wireless network, according to an embodiment as disclosed herein.
Figure 5B:
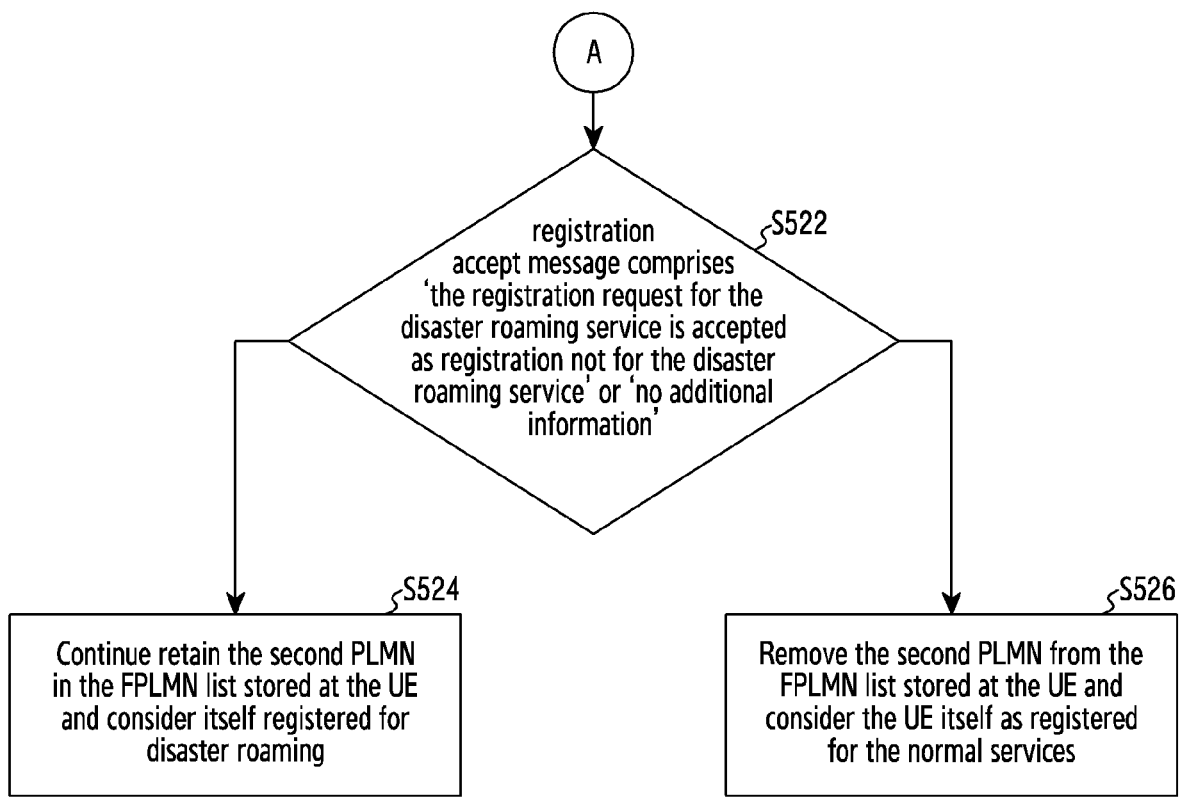

FIG. 5*a* and FIG. 5*b* are flow charts (S500) illustrating a method, implemented by the UE (100), for handling registration of the UE (100) for disaster roaming service in the wireless network (1000), according to an embodiment as disclosed herein. The operations (S502-S526) are performed by the disaster roaming service registration controller (140) or the processor (110, 1030).

At S502, the method includes detecting the first PLMN (200*a*) as the PLMN with the disaster condition. At S504, the method includes detecting whether the FPLMN list is stored at the UE (100). At S506, the method includes detecting the disaster condition by the UE (100) and one of the FPLMN is offering the disaster roaming service. At S508, the method includes selecting the second PLMN (200*b*) from the FPLMN list in response to determining that the FPLMN list is stored at the UE (100). At S510, the method includes sending the registration request for the disaster roaming service to the second PLMN (200*b*).

At S512, the method includes determining whether the UE (100) receives the registration reject message or the acceptance message from the second PLMN (200*b*). If the UE (100) receives the reject message from the second PLMN (200*a*), at S514, the method includes receiving the registration reject message from the second PLMN, wherein the registration reject message comprises a reject cause indicating that UE is not allowed to receive disaster roaming services, with the first PLMN as PLMN with the disaster condition, from the second PLMN. In an embodiment, at S516, the method includes add the first PLMN (200*a*) to the FPLMN list. In an embodiment, at S518, the method includes marking a flag indicating that the UE (100) should never try for the disaster roaming services on the second PLMN (200*b*) during the disaster situation with the first PLMN (200*a*) as PLMN with the disaster condition. i.e. UE should not attempt for disaster roaming service on second PLMN when PLMN with the disaster condition determined is first PLMN, Optionally UE maintains a list of (second PLMN) PLMN-A+(first PLMN) PLMN-D combination which UE should not attempt for disaster roaming service. The UE may not attempt for certain duration determined by the timer, the timer value can be provided by the network or can be UE implementation dependent. In an embodiment, at S520, the method includes marking a flag indicating that the UE (100) should never try for the disaster roaming services on any FPLMN with the first PLMN (200*a*) as PLMN with the disaster condition. Optionally UE maintains a list of first PLMNs as PLMN with the disaster condition which UE should not select to receive disaster roaming service. In an embodiment, at S521, the method includes marking a flag indicating that the UE (100) should not try for the disaster roaming services on the second PLMN. The UE maintains a list of second PLMNs i.e. FPLMNs on which UE should not attempt for disaster roaming service. The UE may not attempt for certain duration determined by the timer, the timer value can be provided by the network or can be UE implementation dependent. In the description at step S514 it's indicated as a single cause is provided by the network in registration reject or in general NAS reject message, this is only for illustration purpose but for steps S516, S518, S520, S521 separate reject causes can be provided by the network to define the respective behaviours at the UE. The UE will perform PLMN selection to select some other PLMN to receive disaster roaming service or normal service.

If the UE (100) receives the accept message from the second PLMN (200a), at S522, the method includes determining whether the registration accept message comprises 'the registration request for the disaster roaming service is accepted as registration not for the disaster roaming service' or 'no additional information'. At S524, the method includes continuing retain the second PLMN (200b) in the FPLMN list stored at the UE (100) and consider itself registered for disaster roaming. At S526, the method includes removing the second PLMN (200b) from the FPLMN list stored at the UE (100) and consider the UE (100) itself as registered for the normal services.

Figure 6:
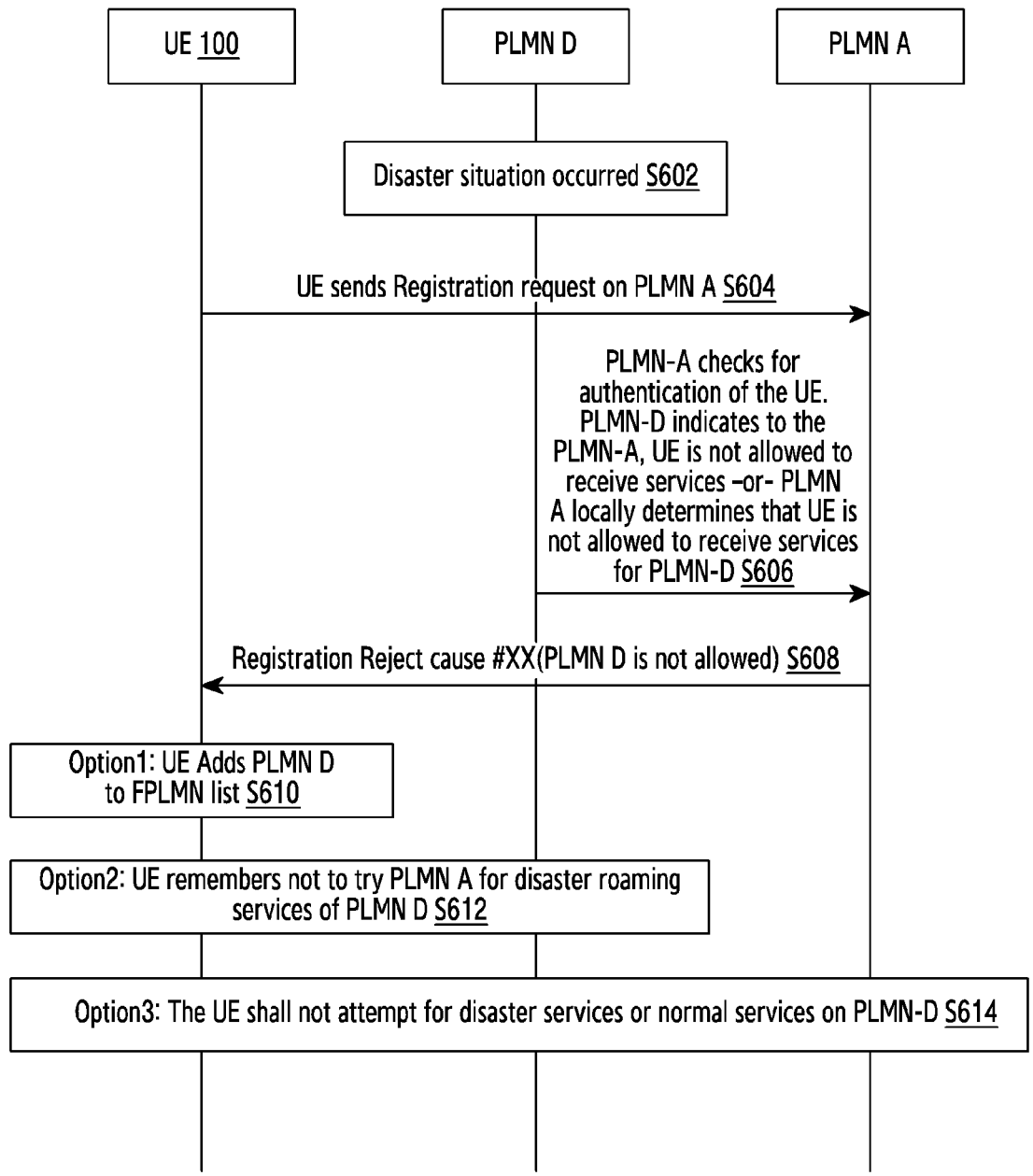
FIG. 6 is an example signalling diagram illustrating a scenario of how to indicate UE about a Forbidden PLMN in case UE has not tried on Forbidden PLMN previously, according to the embodiments as disclosed herein.

FIG. 6 is an example signalling diagram illustrating a scenario of how to indicate the UE (100) about the Forbidden PLMN (or not allowed PLMN) by PLMN-A to the UE (100), according to the embodiments as disclosed herein.

The description in this embodiment is from the perspective of forbidden PLMN which can be extended for forbidden TAI (for example Lists of 5GS forbidden tracking areas) too (i.e., not allowed to receive service in a confined area). The terms disaster inbound roaming services, disaster situation services and disaster services are used interchangeably but are synonyms to each other.

Unlike to the conventional methods and systems, referring to the FIG. 6, the proposed method provides scenario of how to indicate the UE (100) about the Forbidden PLMN (first PLMN) by the second PLMN.

If the UE (100) determines disaster situation optionally with an additional information that PLMN D has faced disaster situation (but the UE (100) is not subscribed to the PLMN D), then the UE (100) may attempt registration on PLMN A, for disaster inbound roaming services.

If the UE (100) attempts to receive disaster situation services over the PLMN A so that it can receive disaster situation services then PLMN A shall reject the UE (100) with a reject cause #XX indicating (optionally by including PLMN D is not allowed or by indicating list of the PLMN ID(s) which are not allowed for the UE) because PLMN-D is not allowed PLMN for the UE (100). In yet another embodiment, the network can give a reject cause #xx which can indicate to the UE (100) that the UE (100) is not supposed to receive service on the PLMN-D or in that particular area (TAI).

In such a situation, the UE (100) must behave as below.

The UE (100) should add PLMN D to forbidden PLMN list (FPLMN list).

The UE (100) may choose not to add PLMN-D to FPLMN list, but it should remember (for example by maintain the list or flag) that the UE (100) should never try for disaster roaming services on PLMN A if disaster is determined for PLMN-D.

The UE (100) may add the PLMN-D to FPLMN till the time it is receiving or searching for disaster situation service after that UE (100) shall remove PLMN-D from FPLMN list, i.e. for example whenever the UE (100) find the PLMN which can provide normal service to the UE (100).

The UE (100) shall not attempt for disaster based services or normal services on PLMN-D.

The UE (100) shall not attempt for disaster based services on any other PLMN (like PLMN-A) which is acting to provide disaster inbound roaming services on for PLMN-D The UE (100) shall not attempt for disaster services on PLMN-A.

The UE (100) shall perform PLMN selection to search for some other PLMN.

In yet another embodiment, PLMN-A can indicate to the UE (100) that it should not attempt for disaster situation services, then the UE (100) shall not attempt for disaster inbound roamer services on PLMN-A or any other VPLMN which is providing disaster situation to the UE (100).

The key point in this embodiment is that first PLMN is indicating to the UE (100) that it is not supposed to receive services on second PLMN optionally only in a particular area or for certain duration of the time.

As part of the reject cause handling, PLMN-A can also provide timer to the UE (100), once received UE (100) shall start the timer and after the expiry of the timer the UE (100) again attempt to receive services on the PLMN-A on behalf of PLMN-D.

In yet another embodiment, the network can give a reject cause which can indicate to the UE (100) that the UE (100) should not receive services over the PLMN-A. The UE (100) shall not attempt for disaster services on PLMN-A.

For the reject cause behaviour described in the embodiment, in order to avoid the problem of fake network, the behaviour of the UE (100) described on the reception of reject cause can be applied after x number of retries (i.e., when reject cause ##x is received, the UE (100) can start a timer and perform PLMN search to see some other PLMN can provide it the services for the duration of the timer). On expiry of the timer, the UE (100) attempts for registration again on PLMN-A if the UE (100) again receives same reject cause #x. Further, the UE (100) shall continue with the behaviour described for "X" number of retries after which the UE (100) determines that current PLMN-A is genuine and the UE (100) should not attempt for service over the PLMN-A.

In this embodiment the term reject cause is used but it can be an indication to the UE (100) in any form for example Information element provided to the UE (100) as part of the Non Access stratum (NAS) or Access stratum (AS) message or it can be an existing reject cause for example cause #11 etc. In this embodiment, the reject cause or the indication is discussed from the perspective of registration procedure but this can be received to the UE (100) during registration or any time after the registration as part of any of the new or old NAS message like DL NAS TRANSPORT or UE CONFIGURATION UPDATE or Deregistration request message, service reject message etc.

Additionally, the UE (100) can try for disaster services on PLMN-A for other PLMN if available other than PLMN-D.

In this embodiment the description is given from the perspective of single PLMN i.e. PLMN-D but it can be extended to a list of PLMN(s). Further, in the description, the PLMN D is subject to disaster and PLMN A is alive and not subject to disaster and providing services to disaster affected UE's of PLMN D.

In the conventional methods and systems, the disaster roaming service provided by the PLMN which is not part of FPLMN list. Below are the conditions:

PLMN D is disaster PLMN in a certain area and PLMN A is providing disaster roaming services to subscribers or inbound roamers of PLMN D.

If the UE (100) is in roaming area and the UE (100) has never tried on PLMN A then it is possible that PLMN-A may not be in FPLMN list for that particular UE (100).

In such a scenario how UE (100) acquires service on PLMN A is not covered in any prior art.

Referring to the FIG. 6, at 602, the disaster situation is occurred at the PLMN D. At 604, the UE (100) sends the registration request on the PLMN A. At 606, the PLMN-A checks for authentication of the UE (100). The PLMN-D indicates to the PLMN-A, the UE (100) is not allowed to receive services or the PLMN A locally determines that the UE (100) is not allowed to receive services for the PLMN-D. At 608, the PLMN A sends the registration Reject cause #XX (PLMN D is not allowed) to the UE (100). Based on the registration Reject cause, option1: at 610, the UE (100) adds PLMN D to the FPLMN list, Option2: at 612, the UE (100) remembers not to try PLMN A for disaster roaming services of the PLMN D and Option3, at 614, the UE (100) shall not attempt for disaster services or normal services on PLMN-D.

Figure 7:
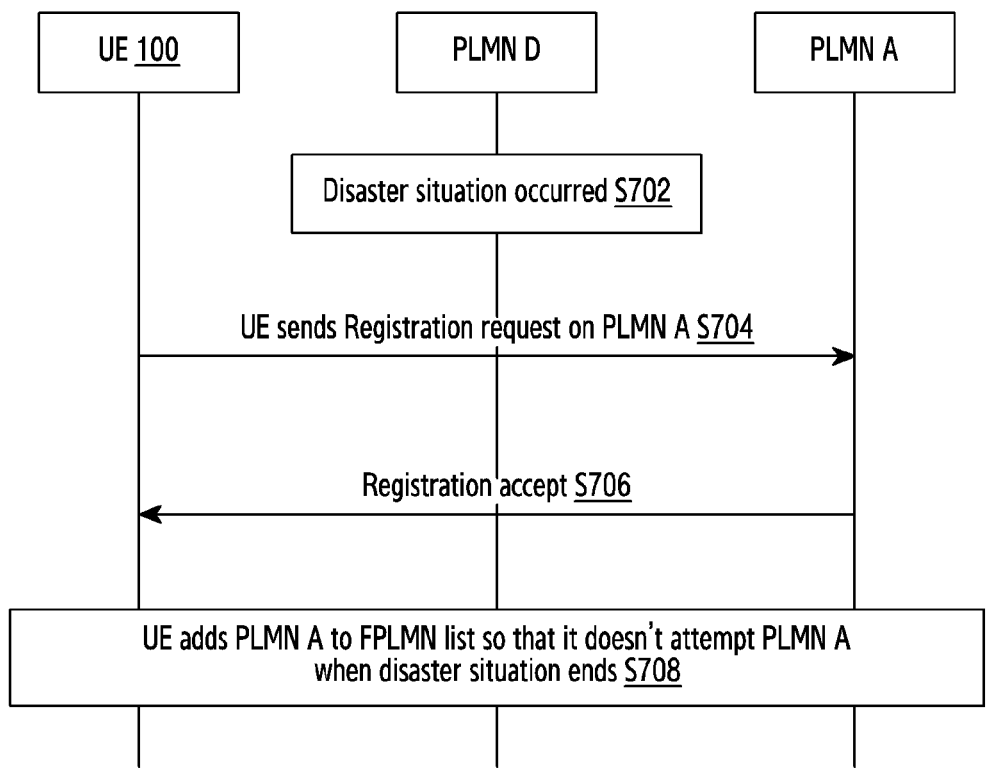
FIG. 7 is an example signalling diagram illustrating a scenario of disaster roaming service provided by the PLMN which is not part of the FPLMN list, according to the embodiments as disclosed herein.

FIG. 7 is an example signalling diagram illustrating a scenario of disaster roaming service provided by the PLMN which is not part of the FPLMN list.

Referring to the FIG. 7, At S702, the disaster situation is occurred at PLMN D. At S704, the UE (100) sends the registration request on the PLMN A. At S706, PLMN A sends the registration accept to the UE (100). At S708, the UE (100) adds the PLMN A to FPLMN list so that it doesn't attempt PLMN A when disaster situation ends.

Unlike to the conventional methods and systems, referring to the FIG. 7 consider a proposed method, below are the conditions:

In a situation where PLMN A is not part of FPLMN list and PLMN A is broadcasting that it can provide disaster roaming services for PLMN D, then the UE (100) should attempt to camp on PLMN A for disaster services if it is included in Disaster PLMN list.

If registration is successful in disaster scenario for PLMN A then the UE (100) should also add the PLMN A in FPLMN list so that it does not attempt to camp on PLMN A when disaster situation is over.

In the description, the PLMN D is subject to disaster and PLMN A is alive and not subject to disaster and providing services to disaster affected PLMN D UE's.

Further, when the UE (100) is registered to PLMN A1 for disaster inbound roaming for PLMN D and is in CONNECTED mode and if there is another PLMN available (for e.g. PLMN A2), then the PLMN A1 shall restrict handover procedure for the UE (100) which is registered to PLMN A1 for disaster inbound roaming. Optionally, PLMN A1 shall not initiate to trigger handover procedure for the UE (100) until PLMN A1 detects or determines that the disaster condition has ended on the PLMN (for e.g. PLMN D). In other words, the handover procedure is restricted till the UE (100) gets the disaster inbound roaming service and it can be handed over only to the PLMN which is known to provide normal service to the UE (100). For e.g. PLMN-D.

The source PLMN decides whether to initiate handover procedure to target PLMN based on determination that target PLMN also can provide disaster inbound roaming service.

The source PLMN determines whether to initiate a handover procedure to target PLMN based on the list of the PLMN IDs stored in the PLMN-A, this list of the PLMN IDs can be provided by the UE (100) to the AMF or the PLMN-D or the list can be configured in the PLMN-A by PLMN-D or by the HPLMN of the UE (100) based on O&M mechanism or any other procedure.

In yet another embodiment, PLMN A1 can initiate a handover procedure to target PLMN A2 for the UE (100) which is registered to PLMN A1 for disaster inbound roaming service and when PLMN A1 initiates the handover procedure or sends the configuration information to the UE (100) about the target PLMN A2, the source PLMN (for e.g. AMF or the RAN node) indicates one or more of below information to the UE (100):

Whether the target PLMN A2 supports disaster inbound roaming; and,
the target PLMN-D(s) for which the disaster inbound roaming is supported by the target PLMN A2;

When PLMN A1 initiates the handover procedure or sends the configuration information to the UE (100) about the target PLMN A2, the UE (100) can determine (for e.g. based on the indication or information provided by the Source PLMN (for e.g. AMF or the RAN Node) in the handover command or configuration information) if the target PLMN (for e.g. PLMN A2) supports disaster inbound roaming or not, and If the UE (100) determines that the target PLMN A2 supports disaster inbound roaming, the UE (100) can trigger registration on PLMN A2 for disaster inbound roaming. i.e. UE can indicate to the AMF that this registration is for disaster inbound roaming service for e.g. by including PLMN-D or 5GS registration type or any IE in NAS message indicates that registration is for disaster inbound roaming service. Alternatively, the UE (100) can trigger a normal registration on PLMN A2 without indicating anything about disaster inbound roaming service in the registration request message, i.e. for example with registration type set to mobility and periodic registration type.

If the UE (100) does not determine that the target PLMN A2 supports disaster inbound roaming, the UE (100) can trigger registration on PLMN A2 for disaster inbound roaming. i.e. UE can indicate to the AMF that this registration is for disaster inbound roaming service for e.g. by including PLMN-D or 5GS registration type or any IE in NAS message indicates that registration is for disaster inbound roaming service. Alternatively, the UE (100) can trigger a normal registration on PLMN A2 without indicating anything about disaster inbound roaming service in the registration request message.

When PLMN A1 initiates a handover command to the UE (100) with the target PLMN A2, the UE (100) doesn't determine if the target PLMN (for e.g. PLMN A2) supports disaster inbound roaming and the UE (100) can trigger registration on the PLMN A2 for disaster inbound roaming. i.e. the UE (100) can indicate to the AMF that this registration is for disaster inbound roaming service for e.g. by including PLMN-D or 5GS registration type or any IE in NAS message indicates that registration is for disaster inbound roaming service. Alternatively, the UE (100) can trigger a normal registration on PLMN A2 without indicating anything about disaster inbound roaming service in the registration request message.

The UE (100) can optionally indicate the source PLMN (for e.g. PLMN A1), Source CELL-ID, Source TAI of Source PLMN-A in response to the handover command or configuration. Optionally, the UE (100) shall not indicate the PLMN (for e.g. PLMN D) for which it is registered for disaster inbound roaming on PLMN-A.

The source PLMN (for e.g. AMF or the RAN node) indicates one or more of below information to the UE (100) in the handover command or handover configuration message:

Whether the target PLMN A2 supports the disaster roaming; and
the target PLMN-D(s) for which the disaster roaming is supported by the target PLMN A2.

The UE (100), in response, can optionally indicate the target PLMN-D(s) for which UE wants disaster roaming service from target PLMN-A2. The target PLMN-D(s) indicated by the UE (100) can be in the priority order of the PLMN-D(s) which can be as per Priority order based on 23.122 or Priority order based on 23.122 except RPLMN.

If the target PLMN A2 doesn't support the disaster inbound roaming, or if the target PLMN A2 supports the disaster inbound roaming and the target PLMN-D(s) for which the disaster inbound roaming is supported by the target PLMN A2 is included by the Source PLMN (for e.g. AMF or the RAN node) in the handover command or handover configuration message but none of the indicated target PLMN-D(s) belong to the list of PLMN-D(s) for which the UE (100) wants disaster inbound roaming service, then the source PLMN (for e.g. AMF or the RAN node) indicates one or more of below information to the target PLMN (like target AMF or target RAN node):

An indication or information to indicate that the handover for the UE is for disaster inbound roaming, and An indication or information to indicate that the UE (100) is registered to PLMN A1 for disaster inbound roaming for PLMN-D.

Based on one or more of the above information, the target PLMN A2 (e.g. the target AMF or target RAN node) determines whether to provide service to the UE (100) or reject/cancel the handover procedure.

If the UE (100) determines that the target PLMN-A2 does not support disaster inbound roaming service, the UE (100) shall delete the stored information for disaster inbound roaming service and assume that it is registered for normal services.

In yet another embodiment, if the UE (100) is already registered with PLMN-A1 for disaster inbound roaming service and during the handover procedure or reselection procedure from PLMN-A1 to PLMN-A2, the UE (100) shall include the PLMN-D in the registration request message when registering with PLMN-A2 even though the UE (100) have a valid 5G GUTI assigned by PLMN-A1. This is because valid 5G GUTI assigned by PLMN-A1 can be used by the AMF of PLMN-A2 to determine which is the previous PLMN (or previous AMF) providing disaster inbound roaming service (i.e. PLMN-A1 or old AMF) but PLMN-A2 will need PLMN-D due to which UE (100) is registering for disaster inbound roaming service. So that when PLMN-D disaster situation is removed, the UE (100) can be notified about the same. The PLMN-A1 to PLMN-A2 is just an example PLMN-D can be included every time UE (100) triggers registration procedure when the UE (100) is already registered for disaster inbound roaming service (on behalf of PLMN-D) so that if registration procedure reaches some other AMF the new AMF is also informed about the PLMN-D.

Consider that the PLMN D is subject to disaster and PLMN A is alive and not subject to disaster. If the UE (100) determines that PLMN D has "Disaster Condition", the UE (100) shall consider PLMN D as not allowable PLMN in automatic PLMN selection. This is applicable regardless of whether PLMN D is HPLMN or any other PLMN. If the UE determines that PLMN D has "Disaster Condition", determines that PLMN A can accept "Disaster Inbound Roamers" from PLMN D, PLMN D is not in the UE's list of forbidden PLMNs and PLMN A is in the UE's list of forbidden PLMNs, then in automatic or manual PLMN selection, the UE (100) shall perform registration procedure on PLMN A (through any NAS or AS signalling message) for disaster inbound roaming for PLMN D, i.e. the UE (100) can indicate this in the registration type of registration message or using any new IE (for e.g. by including PLMN-D) in the registration message that UE is registering for disaster inbound roaming.

If the PLMN A determines that PLMN A can provide normal service to the UE (100) (for e.g., based on the roaming agreement between PLMN-A and HPLMN of the UE) and UE (100) has triggered registration on PLMN A (through any NAS or AS signalling message) for disaster inbound roaming for PLMN D, then:

PLMN A can accept the registration from the UE (100) and indicate to the UE in Registration Accept message or any other NAS Signalling message that this registration is for normal service. The UE (100) shall be registered to PLMN A for normal service. The UE (100) shall remove PLMN A from the UE's list of forbidden PLMNs (FPLMN list). If the UE (100) determines that the PLMN A has provided registration except for normal services, the UE (100) shall delete the stored information for disaster inbound roaming service and assume that it is registered for normal services.

In yet another embodiment, PLMN A can reject the registration from UE (100) for disaster inbound roaming services and indicate to the UE (100) in the registration reject message or any other NAS Signalling message with Reject Cause XXX: "Disaster Inbound Roaming not allowed. Normal Service available". If the UE (100) determines that PLMN A supports Normal Service, the UE (100) shall remove PLMN A from the UE's list of Forbidden PLMNs. The UE (100) shall perform registration on PLMN A (through any NAS or AS signalling message) for normal services, i.e. registration type is not set disaster inbound roaming service. Optionally, the UE (100) can perform PLMN selection as per "Priority order based on 23.122" when the UE (100) receives the stated reject cause.

If the PLMN A determines that PLMN A can provide disaster inbound roaming service to the UE (100), then PLMN A can indicate that this registration is for disaster inbound roaming service for example in the 5GS registration result IE to the UE (100), Optionally PLMN-A can also confirm to the UE (100) the PLMN-D by indicating the same to the UE i.e. the UE (100) may request for PLMN-D1 but AMF can determine it can provide disaster inbound roaming service on behalf of PLMN-D2. The UE (100) shall determine that it is registered for disaster inbound roaming service and behave according to the principles of disaster inbound roaming service for e.g. UE (100) will have different higher priority timer value determination "T", the UE (100) will not remove the current PLMN-A from Forbidden PLMN (FPLMN) list etc due to the received registration accept message etc.

The above handling is also helpful in the case where UE's FPLMN list is not yet updated to remove PLMN-A. But PLMN-A has become a normal roaming partner with HPLMN.

Figure 8:
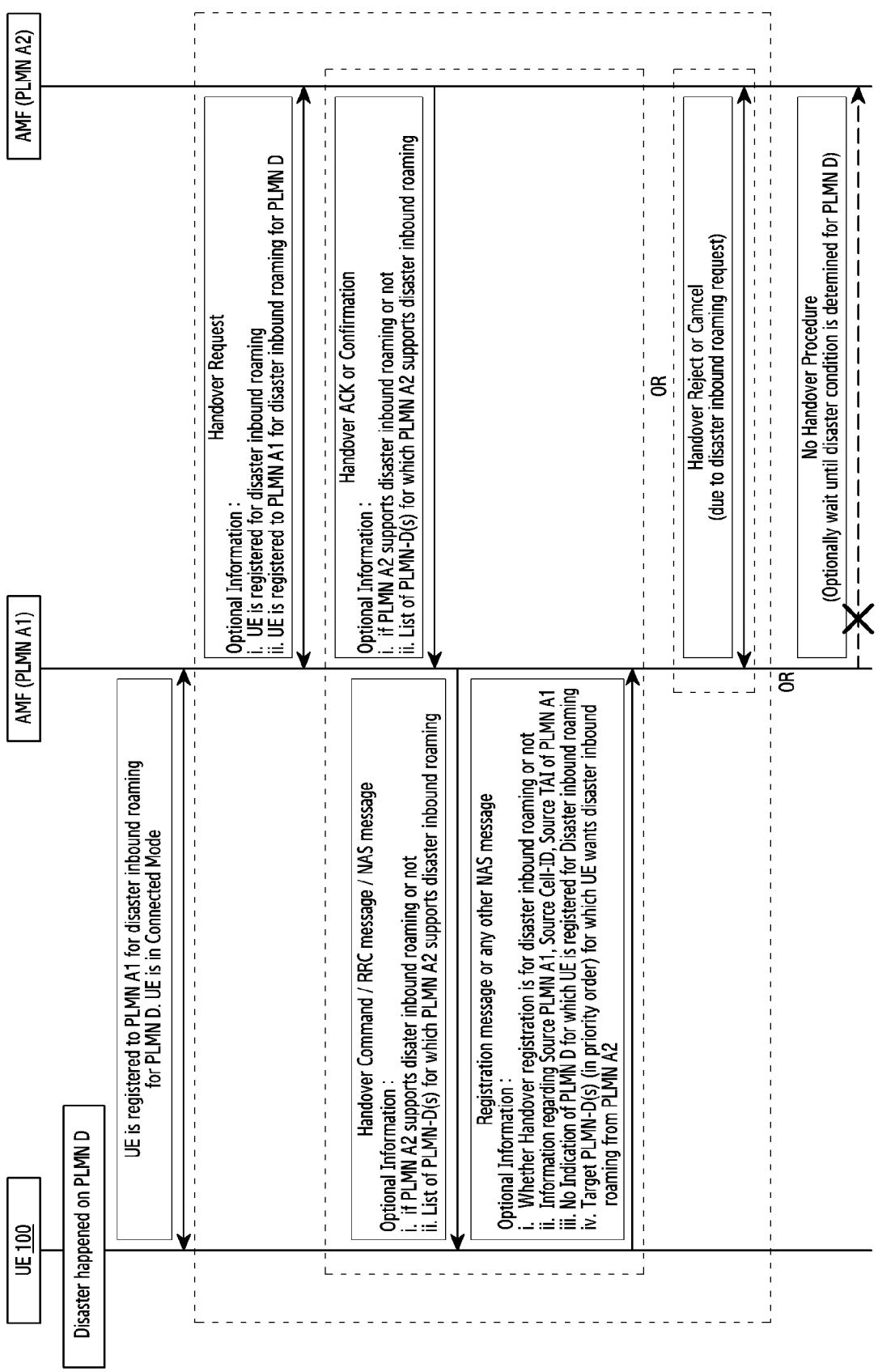
FIG. 8 illustrates a scenario, wherein the UE is registered with PLMN A for disaster inbound roaming service and a trigger to handover procedure has occurred then determining whether the UE should be handed over to target PLMN ID or not.

FIG. 8 depicts a scenario, wherein the UE (100) is registered with PLMN A for disaster inbound roaming service and a trigger to handover procedure has occurred then determining whether the UE (100) should be handed over to target PLMN ID or not, according to prior arts.

Figure 9A:
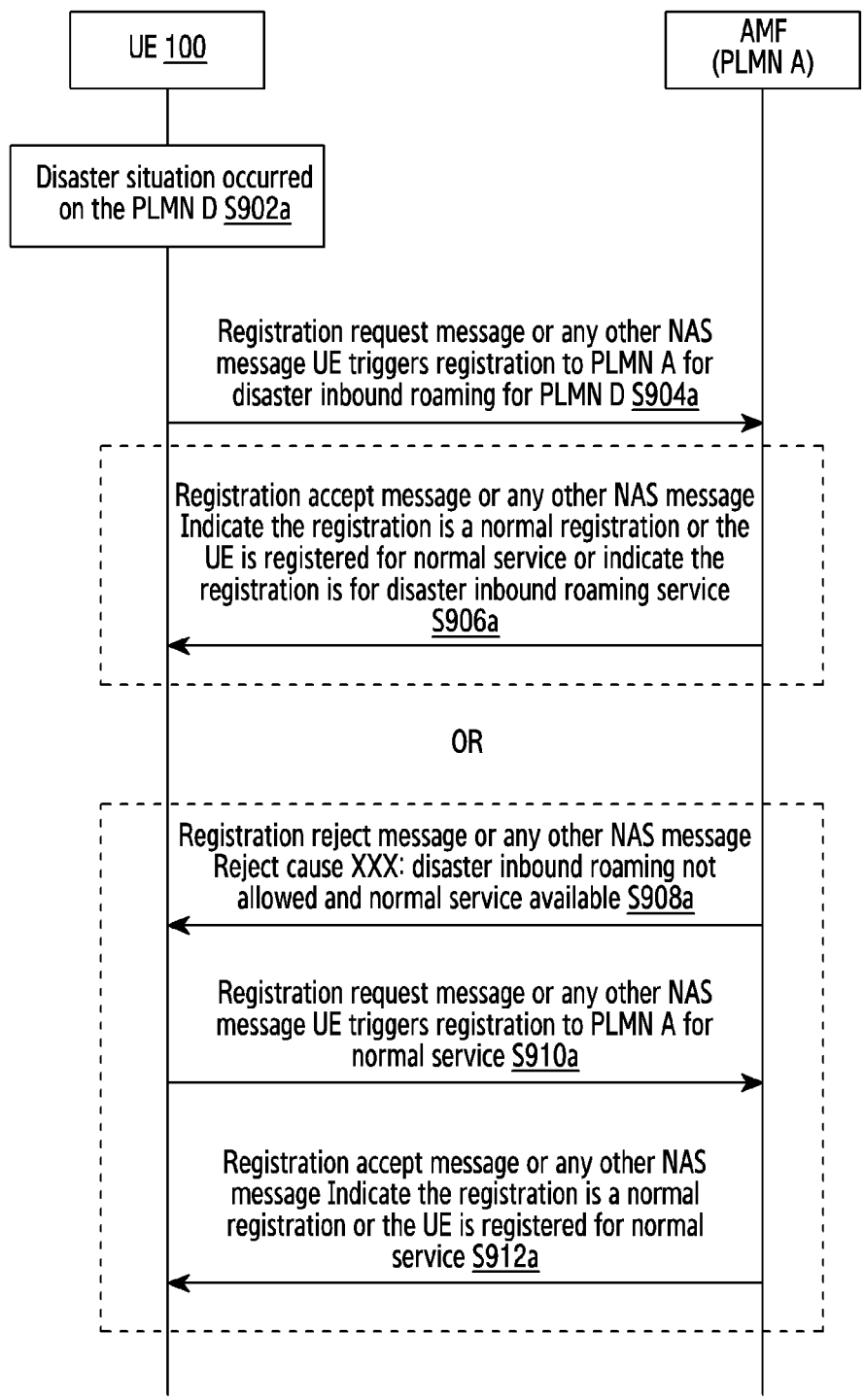
FIG. 9A illustrates an example scenario, wherein the UE is attempting to register for disaster inbound roaming service but network has determined that it can provide normal service to the UE, according to embodiments as disclosed herein.
Figure 9B:
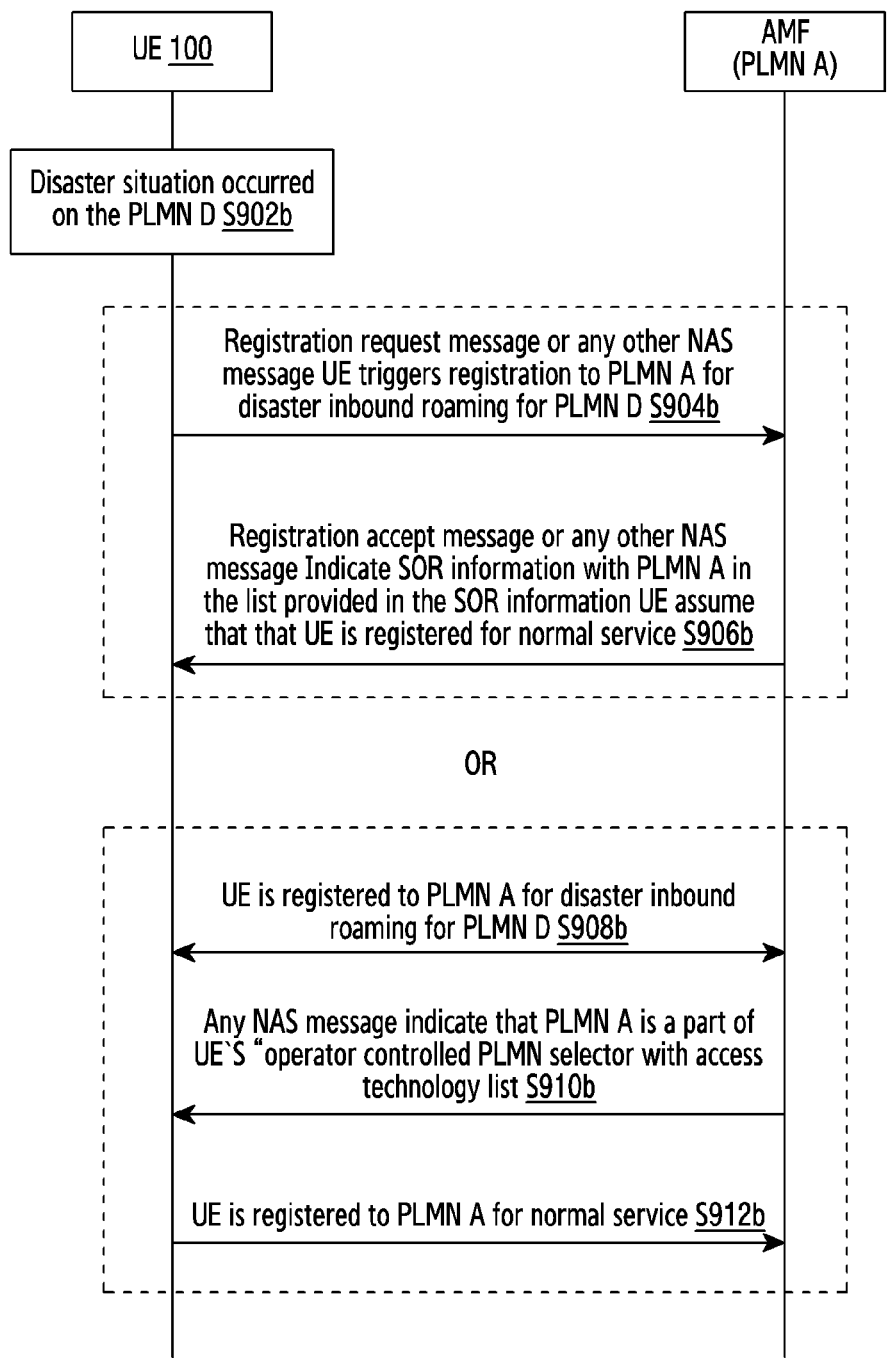
FIG. 9B illustrates an example scenario, wherein the UE is attempting to register for disaster inbound roaming service but network has determined that it can provide normal service to the UE, according to embodiments as disclosed herein.

In FIG. 9A, PLMN D is subject to disaster and PLMN A is alive and not subject to disaster and can provide disaster inbound roaming to the UE (100) for PLMN D. In FIG. 9B, PLMN D is subject to disaster and PLMN A is alive and not subject to disaster and can provide disaster inbound roaming to the UE (100) for PLMN D. In this embodiment, when it is specified that the UE (100) will indicate any information then it can be part of the NAS message which is a response NON access stratum (NAS) message of the network or the UE (100) can proactively send this information in one of the NAS messages to the network i.e. PLMN-A).

"Priority order based on 23.122" is defined as below (as in 4.4.3.1.1 Automatic Network Selection Mode Procedure):

The MS selects and attempts registration on other PLMN/access technology combinations, if available and allowable, in the following order:

1) RPLMN.
Either the HPLMN (if the EHPLMN list is not present or is empty) or the highest priority EHPLMN that is available (if the EHPLMN list is present);
ii) Each PLMN/access technology combination in the "User Controlled PLMN Selector with Access Technology" data file in the SIM (in priority order) (UPLMN list);
iii) Each PLMN/access technology combination in the "Operator Controlled PLMN Selector with Access Technology" data file in the SIM (in priority order) or stored in the ME (in priority order) (OPLMN list);
iv) Other PLMN/access technology combinations with received high quality signal in random order;
NOTE 1: High quality signal is defined in the appropriate AS specification.
v) Other PLMN/access technology combinations in order of decreasing signal quality.
VI) FPLMN list PLMNs Priority order based on 23.122 except RPLMN is defined as below:

Follow the same order "Priority order based on 23.122", but skip RPLMN.

Referring to the FIG. 9a, at S902a, the UE (100) detects that the disaster situation is occurred on the PLMN D. At S904a, the UE (100) sends the registration request message or any other NAS message to the PLMN A, such that the UE (100) triggers the registration to PLMN A for the disaster inbound roaming for the PLMN D. At S906a, the PLMN A sends the registration accept message or any other NAS message to the UE (100) and the registration accept message indicates that the registration is a normal registration or the UE (100) is registered for the normal service or indicate the registration is for disaster inbound roaming service (i.e. UE (100) is registered for the disaster roaming service).

At S908a, the PLMN A sends the registration reject message or any other NAS message to the UE (100). The registration reject message includes the reject cause XXX: disaster inbound roaming not allowed and normal service available. At S910a, the UE (100) sends the registration request message or any other NAS message to the PLMN A and the UE (100) triggers the registration to PLMN A for the normal service. At S912a, the PLMN A sends the registration accept message or any other NAS message to the UE (100) and the registration accept message indicates that the registration is a normal registration or the UE is registered for the normal service.

Referring to the FIG. 9b, at S902b, the UE (100) detects that the disaster situation is occurred on the PLMN D. At S904b, the UE (100) sends the registration request message or any other NAS message to the PLMN A and the UE (100) triggers the registration to the PLMN A for disaster inbound roaming for the PLMN D. At S906b, the PLMN A sends the registration accept message or any other NAS message to the UE (100). The registration accept message indicates that the SOR information with PLMN A in the list provided in the SOR information. The UE (100) assumes that that the UE (100) is registered for the normal service. At S908b, the UE is registered to the PLMN A for the disaster inbound roaming for the PLMN D. At S910b, the PLMN A sends the any NAS message indicating that the PLMN A is a part of UE'S "operator controlled PLMN selector with access technology list. At S912b, the UE (100) is registered to the PLMN A for the normal service.

The various actions, acts, blocks, steps, or the like in the flow charts (S400 and S500) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Figure 10:
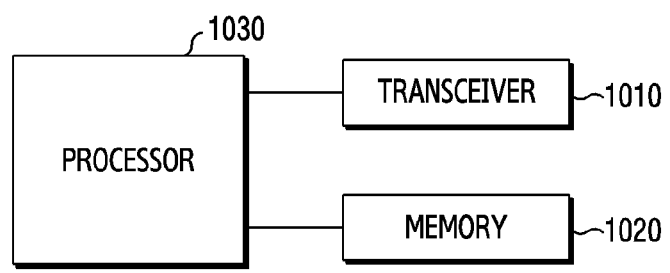
FIG. 10 is a block diagram illustrating a structure of a UE according to an embodiment of the disclosure.

FIG. 10 is a block diagram of an internal configuration of a UE, according to an embodiment.

As shown in FIG. 10, the UE according to an embodiment may include a transceiver 1010, a memory 1020, and a processor 1030. The transceiver 1010, the memory 1020, and the processor 1030 of the UE may operate according to a communication method of the UE described above. However, the components of the UE are not limited thereto. For example, the UE may include more or fewer components than those described above. In addition, the processor 1030, the transceiver 1010, and the memory 1020 may be implemented as a single chip. Also, the processor 1030 may include at least one processor.

The transceiver 1010 collectively refers to a UE receiver and a UE transmitter, and may transmit/receive a signal to/from a base station or a network entity. The signal transmitted or received to or from the base station or a network entity may include control information and data. The transceiver 1010 may include a RF transmitter for up-converting and amplifying a frequency of a transmitted signal, and a RF receiver for amplifying low-noise and down-converting a frequency of a received signal. However, this is only an example of the transceiver 1010 and components of the transceiver 1010 are not limited to the RF transmitter and the RF receiver.

Also, the transceiver 1010 may receive and output, to the processor 1030, a signal through a wireless channel, and transmit a signal output from the processor 1030 through the wireless channel.

The memory 1020 may store a program and data required for operations of the UE. Also, the memory 1020 may store control information or data included in a signal obtained by the UE. The memory 1020 may be a storage medium, such as read-only memory (ROM), random access memory (RAM), a hard disk, a CD-ROM, and a DVD, or a combination of storage media.

The processor 1030 may control a series of processes such that the UE operates as described above. For example, the transceiver 1010 may receive a data signal including a control signal transmitted by the base station or the network entity, and the processor 1030 may determine a result of receiving the control signal and the data signal transmitted by the base station or the network entity.

Figure 11:
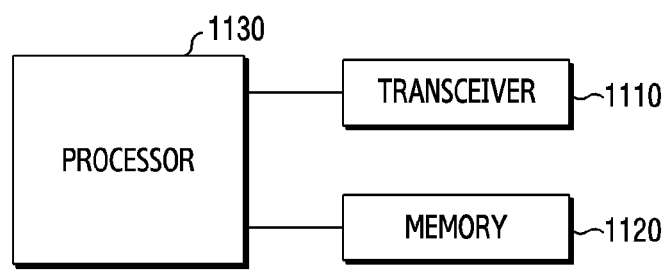
FIG. 11 is a block diagram illustrating a structure of a base station according to an embodiment of the disclosure.

FIG. 11 is a block diagram of an internal configuration of a base station, according to an embodiment.

As shown in FIG. 11, the base station according to an embodiment may include a transceiver 1110, a memory 1120, and a processor 1130. The transceiver 1110, the memory 1120, and the processor 1130 of the base station may operate according to a communication method of the base station described above. However, the components of the base station are not limited thereto. For example, the base station may include more or fewer components than those described above. In addition, the processor 1130, the transceiver 1110, and the memory 1120 may be implemented as a single chip. Also, the processor 1130 may include at least one processor.

The transceiver 1110 collectively refers to a base station receiver and a base station transmitter, and may transmit/receive a signal to/from a terminal or a network entity. The signal transmitted or received to or from the terminal or a network entity may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the base station. Also, the memory 1120 may store control information or data included in a signal obtained by the base station. The memory 1120 may be a storage medium, such as read-only memory (ROM), random access memory (RAM), a hard disk, a CD-ROM, and a DVD, or a combination of storage media.

The processor 1130 may control a series of processes such that the base station operates as described above. For example, the transceiver 1110 may receive a data signal including a control signal transmitted by the terminal, and the processor 1130 may determine a result of receiving the control signal and the data signal transmitted by the terminal.

Figure 12:
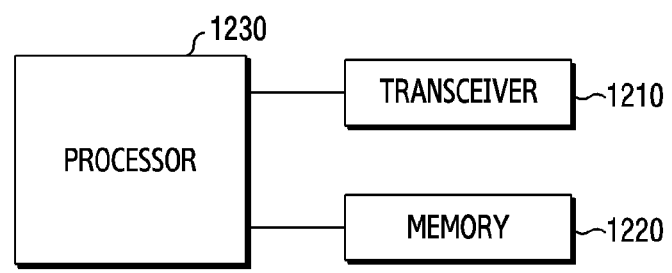
FIG. 12 is a block diagram illustrating a structure of a network entity according to an embodiment of the disclosure.

FIG. 12 is a block diagram showing an internal structure of a network entity, according to an embodiment of the present disclosure. As shown in FIG. 12, the network entity of the present disclosure may include a transceiver 1210, a memory 1220, and a processor 1230. The transceiver 1210, the memory 1220, and the processor 1230 of the network entity may operate according to a communication method of the network entity described above. However, the components of the terminal are not limited thereto. For example, the network entity may include more or fewer components than those described above. In addition, the processor 1230, the transceiver 1210, and the memory 1220 may be implemented as a single chip. Also, the processor 1230 may include at least one processor.

According to the present invention, the network entity includes at least one entity of a core network. For example, the network entity includes AMF (access and mobility management function), SMF (session management function), PCF (policy control function), NRF (network repository function), UPF (user plane function), NSSF (network slicing selection function), AUSF (authentication server function), UDM (unified data management) and NEF (network exposure function). However, the network entity is not limited thereto.

The transceiver 1210 collectively refers to a network entity receiver and a network entity transmitter, and may transmit/receive a signal to/from a base station or a UE. The signal transmitted or received to or from the base station or the UE may include control information and data. In this regard, the transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

Also, the transceiver 1210 may receive and output, to the processor 1230, a signal through a wireless channel, and transmit a signal output from the processor 1230 through the wireless channel.

The memory 1220 may store a program and data required for operations of the network entity. Also, the memory 1220 may store control information or data included in a signal obtained by the network entity. The memory 1220 may be a storage medium, such as ROM, RAM, a hard disk, a CD-ROM, and a DVD, or a combination of storage media.

The processor 1230 may control a series of processes such that the network entity operates as described above. For example, the transceiver 1210 may receive a data signal including a control signal, and the processor 1230 may determine a result of receiving the data signal.

Accordingly, the embodiment herein is to provide a method for handling registration of a UE for disaster roaming service in a wireless network. The method includes receiving, by a network entity of a second PLMN, a registration request for the disaster roaming service from the UE with a first PLMN as PLMN with a disaster condition. Further, the method includes determining, by the network entity of the second PLMN, whether the UE is allowed to receive the disaster roaming service with first PLMN as PLMN with the disaster condition from the second PLMN or the UE is allowed to receive normal service from the second PLMN. Further, the method includes performing, by the network entity of the second PLMN, one of: sending a registration reject message to the UE in response to determining that the UE is not allowed to receive the disaster roaming service, with the first PLMN as PLMN with the disaster condition, from the second PLMN, wherein the registration reject message comprises a reject cause indicating that UE is not allowed to receive services from the second PLMN with the first PLMN as the PLMN with disaster condition, and determining whether the second PLMN provides the disaster roaming service or normal service to the UE in response to determining that the UE is allowed to receive the service from the second PLMN, and sending a registration accept message to the UE, wherein the registration accept message comprises an information element indicating one of: 'the registration request for the disaster roaming service is accepted as registration not for the disaster roaming service' when the second PLMN provides the normal services to the UE, and 'no additional information' when the second PLMN provides the disaster roaming service to the UE.

In an embodiment, the information element comprises a 5GS registration result information.

Accordingly, the embodiment herein is to provide a method for handling registration of a UE for disaster roaming service in a wireless network. The method includes detecting, by the UE, a first PLMN as PLMN with a disaster condition. Further, the method includes sending, by the UE, a registration request for the disaster roaming service to a second PLMN, when the second PLMN provides the disaster roaming service with the first PLMN as PLMN with the disaster condition. Further, the method includes receiving, by the UE, one of: a registration reject message from the second PLMN, where the registration reject message comprises a reject cause indicating that UE is not allowed to receive disaster roaming services, with the first PLMN as PLMN with the disaster condition, from the second PLMN, and a registration accept message from the second PLMN, wherein the registration accept message comprises an information element (IE) indicating one of 'the registration request for the disaster roaming service is accepted as registration not for the disaster roaming service' when the second PLMN provides normal services to the UE or 'no additional information' when the second PLMN provides the disaster roaming service to the UE.

In an embodiment, sending, by the UE, the registration request for disaster roaming service to the second PLMN includes detecting, by the UE, whether a Forbidden PLMN (FPLMN) list is stored at the UE, detecting the disaster condition by the UE and one of the FPLMN is offering the disaster roaming service, and selecting, by the UE, the second PLMN from the FPLMN list in response to determining that the FPLMN list is stored at the UE, and sending the registration request for the disaster roaming service to the second PLMN.

In an embodiment, the method includes removing, by the UE, the second PLMN from the FPLMN list stored at the UE and considering the UE itself as registered for the normal services upon receiving the registration accept message comprising the registration result IE indicating 'the registration request for the disaster roaming service is accepted as registration not for the disaster roaming service'.

In an embodiment, the method includes continue retaining, by the UE, the second PLMN in the FPLMN list stored at the UE and consider itself registered for disaster roaming upon receiving the registration accept message comprising the registration result IE indicating 'no additional information'.

In an embodiment, the method includes continue adding, by the UE, the second PLMN to the FPLMN list at the UE upon receiving the registration accept message comprising the registration result IE indicating 'no additional information'.

In an embodiment, upon receiving the registration reject message from the second PLMN, the method includes one of: adding, by the UE, the first PLMN to the FPLMN list, marking, by the UE, a flag indicating that the UE should never try for the disaster roaming services on second PLMN during the disaster situation with the first PLMN as PLMN with the disaster condition, marking, by the UE, a flag indicating that the UE should never try for the disaster roaming services on the second PLMN during the disaster situation, and marking, by the UE, a flag indicating that the UE should never try for the disaster roaming services on any FPLMN with the first PLMN as PLMN with the disaster condition.

In an embodiment, the registration request for the disaster roaming service includes a registration type value set to "disaster roaming initial registration" or "disaster roaming mobility registration updating" or a new information element indicating registration for disaster roaming service.

Accordingly, the embodiment herein is to provide a network entity of a second PLMN for handling registration of a UE for disaster roaming service in a wireless network. The network entity of the second PLMN includes a transceiver, a memory and a processor. The processor coupled with the memory and the processor and is configured to receive a registration request for the disaster roaming service from the UE with a first PLMN as PLMN with a disaster condition. Further, the processor is configured to determine whether the UE is allowed to receive the disaster roaming service with first PLMN as PLMN with the disaster condition from the second PLMN or the UE is allowed to receive normal service from the second PLMN. Further, the processor is configured to perform one of send a registration reject message to the UE in response to determining that the UE is not allowed to receive the disaster roaming service, with the first PLMN as PLMN with the disaster condition, from the second PLMN, wherein the registration reject message comprises a reject cause indicating that UE is not allowed to receive services from the second PLMN with the first PLMN as the PLMN with disaster condition, and determine whether the second PLMN provides the disaster roaming service or normal service to the UE in response to determining that the UE is allowed to receive the service from the second PLMN, and send a registration accept message to the UE, wherein the registration accept message comprises an information element indicating one of: 'the registration request for the disaster roaming service is accepted as registration not for the disaster roaming service' when the second PLMN provides the normal services to the UE, and 'no additional information' when the second PLMN provides the disaster roaming service to the UE.

In an embodiment, wherein the information element comprises a 5GS registration result information.

In an embodiment, wherein the network entity of the second PLMN comprises an access and mobility management function (AMF).

Accordingly, the embodiment herein is to provide a UE for handling registration for disaster roaming service in a wireless network. The UE includes a transceiver, a memory and a processor. The processor coupled with the transceiver and the memory and is configured to detect a first PLMN as PLMN with a disaster condition and send a registration request for the disaster roaming service to a second PLMN, when the second PLMN provides the disaster roaming service with the first PLMN as PLMN with the disaster condition. The processor is configured to receive one of: a registration reject message from the second PLMN, wherein the registration reject message comprises a reject cause indicating that UE is not allowed to receive disaster roaming services, with the first PLMN as PLMN with the disaster condition, from the second PLMN, and a registration accept message from the second PLMN, wherein the registration accept message comprises an IE indicating one of 'the registration request for the disaster roaming service is accepted as registration not for the disaster roaming service' when the second PLMN provides normal services to the UE or 'no additional information' when the second PLMN provides the disaster roaming service to the UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

What is claimed is:

1. A method performed by an access and mobility management function (AMF) entity in a wireless communication system, the method comprising:
receiving, from a user equipment (UE), a registration request message associated with a disaster roaming service, wherein the registration request message includes information on a public land mobile network (PLMN);
in response to determining that the UE is allowed to register for the disaster roaming service, transmitting, to the UE, a first registration accept message including first information indicating that the UE is allowed to register for the disaster roaming service; and
in response to determining that the UE is allowed to register for a normal service, transmitting, to the UE, a second registration accept message including second information indicating that the UE is allowed to register for the normal service,
wherein the PLMN is deleted from a forbidden PLMN (FPLMN) list, and
wherein the normal service includes a roaming service except the disaster roaming service.

2. The method of claim 1, wherein the first information and the second information are included in a 5th generation system (5GS) registration result information element (IE).

3. The method of claim 1, wherein, in response to determining that the PLMN does not support for the disaster roaming service, a registration reject message is transmitted to the UE, and
wherein the registration reject message includes information on a reject cause indicating that the disaster roaming service is not supported.

4. The method of claim 1, wherein information on a disaster related indication for indicating a PLMN with a disaster condition is broadcast by an available cell of the PLMN which is associated with the AMF entity.

5. A method performed by a user equipment (UE) in a wireless communication system, the method comprising:
detecting a disaster condition;
transmitting, to an access and mobility management function (AMF) entity, a registration request message associated with a disaster roaming service, wherein the registration request message includes information on a public land mobile network (PLMN) providing a disaster roaming service;
in response to determining that the UE is allowed to register for the disaster roaming service, receiving, from the AMF entity, a first registration accept message including first information indicating that the UE is allowed to register for the disaster roaming service; and
in response to determining that the UE is allowed to register for a normal service, receiving, from the AMF entity, a second registration accept message including second information indicating that the UE is allowed to register for the normal service and deleting the PLMN from a forbidden PLMN (FPLMN) list,
wherein the normal service includes a roaming service except the disaster roaming service.

6. The method of claim 5, further comprising:
identifying whether the FPLMN list is stored at the UE;
identifying that one of the FPLMN is offering the disaster roaming service; and
selecting the PLMN from the FPLMN list responsive to determining that in case that the FPLMN list is stored at the UE.

7. An access and mobility management function (AMF) entity in a wireless communication system, the AMF entity comprising:
a transceiver; and
at least one processor coupled with the transceiver and configured to:

receive, from a user equipment (UE), a registration request message associated with a disaster roaming service, wherein the registration request message includes information on a public land mobile network (PLMN), in response to determining that the UE is allowed to register for the disaster roaming service, transmit, to the UE, a first registration accept message including first information indicating that the UE is allowed to register for the disaster roaming service, and in response to determining that the UE is allowed to register for a normal service, transmit, to the UE, a second registration accept message including second information indicating that the UE is allowed to register for the normal service, wherein the PLMN is deleted from a forbidden PLMN (FPLMN) list, and wherein the normal service includes a roaming service except the disaster roaming service.

8. The AMF entity of claim 7, wherein the first information and the second information are included in a 5th generation system (5GS) registration result information element (IE).

9. The AMF entity of claim 7, wherein, in response to determining that the PLMN does not support for the disaster roaming service, a registration reject message is received from the UE, and wherein the registration reject message includes information on a reject cause indicating that the disaster roaming service is not supported.

10. The AMF entity of claim 7, wherein information on a disaster related indication for indicating a PLMN with a disaster condition is broadcast by an available cell of the PLMN which is associated with the AMF entity.

11. A user equipment (UE) in a wireless communication system, the UE comprising:

a transceiver; and at least one processor coupled with the transceiver and configured to:

detect a disaster condition, transmit, to an access and mobility management function (AMF) entity, a registration request message associated with a disaster roaming service, wherein the registration request message includes information on a public land mobile network (PLMN) providing a disaster roaming service, in response to determining that the UE is allowed to register for the disaster roaming service, receive, from the AMF entity, a first registration accept message including first information indicating that the UE is allowed to register for the disaster roaming service, and in response to determining that the UE is allowed to register for a normal service, receive, from the AMF entity, a second registration accept message including second information indicating that the UE is allowed to register for the normal service, and delete the PLMN from a forbidden PLMN (FPLMN) list, wherein the normal service includes a roaming service except the disaster roaming service.

12. The UE of claim 11, wherein the at least one processor is further configured to:

identify whether the FPLMN list is stored at the UE, identify that one of the FPLMN is offering the disaster roaming service, and select the PLMN from the FPLMN list responsive to determining that the FPLMN list is stored at the UE.

* * * * *